US010825071B2

(12) United States Patent
Sewak et al.

(10) Patent No.: US 10,825,071 B2
(45) Date of Patent: Nov. 3, 2020

(54) ADAPTIVE MULTI-PERCEPTUAL SIMILARITY DETECTION AND RESOLUTION

(71) Applicant: International Business Machines Corporation, Armonk, NY (US)

(72) Inventors: Mohit Sewak, Pune (IN); Sachchidanand Singh, Pune (IN)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 15/948,014

(22) Filed: Apr. 9, 2018

(65) Prior Publication Data

US 2019/0311415 A1 Oct. 10, 2019

(51) Int. Cl.
| | |
|---|---|
| *G06Q 30/06* | (2012.01) |
| *G06K 9/62* | (2006.01) |
| *G06N 20/00* | (2019.01) |
| *G06K 9/66* | (2006.01) |
| *G06K 9/72* | (2006.01) |
| *G06F 40/40* | (2020.01) |

(52) U.S. Cl.
CPC ....... *G06Q 30/0629* (2013.01); *G06K 9/6215* (2013.01); *G06K 9/6232* (2013.01); *G06K 9/66* (2013.01); *G06K 9/72* (2013.01); *G06N 20/00* (2019.01); *G06F 40/40* (2020.01)

(58) Field of Classification Search
CPC .... G06N 20/00; G06K 9/6215; G06K 9/6232; G06K 9/66; G06K 9/72
See application file for complete search history.

(56) References Cited

U.S. PATENT DOCUMENTS

| | | | |
|---|---|---|---|
| 2016/0005097 A1 | 1/2016 | Hsiao et al. | |
| 2016/0110794 A1 | 4/2016 | Hsiao et al. | |
| 2017/0153615 A1* | 6/2017 | Krompa | G05B 19/048 |
| 2017/0316269 A1* | 11/2017 | Bailer | G06K 9/00744 |
| 2017/0323185 A1 | 11/2017 | Bhardwaj et al. | |
| 2018/0158197 A1* | 6/2018 | Dasgupta | G05D 1/0094 |

OTHER PUBLICATIONS

Shankar, D. et al., "Deep Learning based Large Scale Visual Recommendation and Search for E-Commerce", Computer Vision and Pattern Recognition, arXiv: 1703,02344, pp. 1-9, Mar. 7, 2017.

* cited by examiner

*Primary Examiner* — Edward Park
(74) *Attorney, Agent, or Firm* — Lieberman & Brandsdorfer, LLC

(57) ABSTRACT

Embodiments relate to an intelligent computer platform to compute visual similarity across image objects. An object detection algorithm is utilized to identify image objects and to produce a tensor representation of the identified object. Multi-visual contextual similarity of the object is conducted to assess and determine related object images. A re-assessment of similarity is dynamically conducted in response to a product image selection. The re-assessment utilizes the tensor representations of the related object images, thereby conducting a mathematical assessment of similarity and object image identification. A final product is identified and selected based on the dynamic re-assessment and convergence on a directed outcome with minimal iterations of object interaction.

20 Claims, 16 Drawing Sheets

ADAPTIVE MULTI-PERCEPTUAL SIMILARITY DETECTION AND RESOLUTION

BACKGROUND

The present embodiments relate to natural language processing and electronic image processing. More specifically, the embodiment relate to cognitive computing and deep learning to integrate product search and motivation in an electronic environment.

In the field of artificially intelligent computer systems, natural language systems (such as the IBM Watson™ artificially intelligent computer system or and other natural language question answering systems) process natural language based on knowledge acquired by the system. To process natural language, the system may be trained with data derived from a data source or corpus of knowledge.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. AI is a subset of cognitive computing, which refers to systems that learn at scale, reason with purpose, and naturally interact with humans. Cognitive computing is a mixture of computer science and cognitive science. Cognitive computing utilizes self-teaching algorithms that use data minimum, visual recognition, and natural language processing to solve problems and optimize human processes.

SUMMARY

The embodiments include a system, computer program product, and method for efficient product identification and convergence.

In one aspect, a system is provided for use with an intelligent computer platform for computing visual similarity and identification of a product responsive to the computed similarity. A processing unit is provided operatively coupled to memory and is operatively coupled to the artificial intelligence platform. A tool, in the form of a knowledge engine, is activated by the artificial intelligence platform and employed to conduct the similarity assessment and product identification. The knowledge engine is provided with an object manager and a context manager. The object manager utilizes an object detection algorithm to identify two or more image objects, and to produce a tensor representation of each identified object. The tensor representation is a multi-feature mathematical representation of object image features. Each object feature is a physical component within the represented object. The context manager assesses multi-visual contextual similarity. More specifically, the context manager applies a vector similarity algorithm against corresponding vectors of related object images, and identifies one or more similar objects based on a similarity context returned from the algorithm. In response to selection of a product represented as an image, the context manager dynamically re-assesses the similarity context based on proximity of the tensor representation of the selected product image to the tensor representation of the related object image(s). A final product is identified and selected in response to the dynamic re-assessment.

In another aspect, a computer program device is provided for use with an intelligent computer platform for computing visual similarity and identification of a product responsive to the computed similarity. The device has program code embodied therewith. The program code is executable by a processing unit to support the similarity assessment and product selection and identification. Program code employs an object detection algorithm to identify two or more image objects and to produce a tensor representation of each image object. The tensor representation is a multi-feature mathematical representation of object image features, each object image feature being a physical component within the object. Program code assesses multi-visual contextual similarity, including application of a vector similarity algorithm against one or more corresponding vectors of one or more related object images. The program code identifies one or more similar objects based on a similarity context returned from the vector similarity algorithm. Responsive to selection of a product image, program code dynamically re-assesses the similarity context based on proximity of the tensor representation of the selected product image to the tensor representation of the one or more related object images. A final product is identified and selected in response to the dynamic re-assessment.

In yet another aspect, a method is provided for use by an intelligent computer platform for computing visual similarity and identification of a product responsive to the computed similarity. The method employs an object detection algorithm to identify two or more image objects, each object being physical. A tensor representation of each image object is produced. The tensor representation is a multi-feature mathematical representation of object image features, and each object image feature is a physical component within the object. Multi-visual contextual similarity is assessed. The includes applying a vector similarity algorithm against one or more corresponding vectors of one or more related object images, and identifying one or more similar objects based on a similarity context returned from the vector similarity algorithm. In response to selecting a product image, the method dynamically re-assesses the similarity context based on proximity of the tensor representation of the selected product image to the tensor representation of the one or more related object images. A final product is identified and selected in response to the dynamic re-assessment.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Embodiments shown and described herein are related to the field of artificial intelligence and electronic commerce, and more particularly to a product recommendation system. The following described exemplary embodiments provide a system, computer program product, and method, among other things, to recommend products or services with minimal selection iterations. The embodiments disclosed herein improve the technical field of electronic commerce and product recommendation. When utilizing an electronic commerce venue to search for a product or service, it is understood that suggested or recommended products are displayed to facilitate convergence to a final item selection. It is further understood that there is a direct correlation between recommendation iterations and conversion to a sale. Accordingly, the embodiments described herein are directed to expediting a product search in the electronic commerce venue that utilizes understanding motivation to converge on a product for selection and sale with minimal recommendation iterations.

Figure 1:
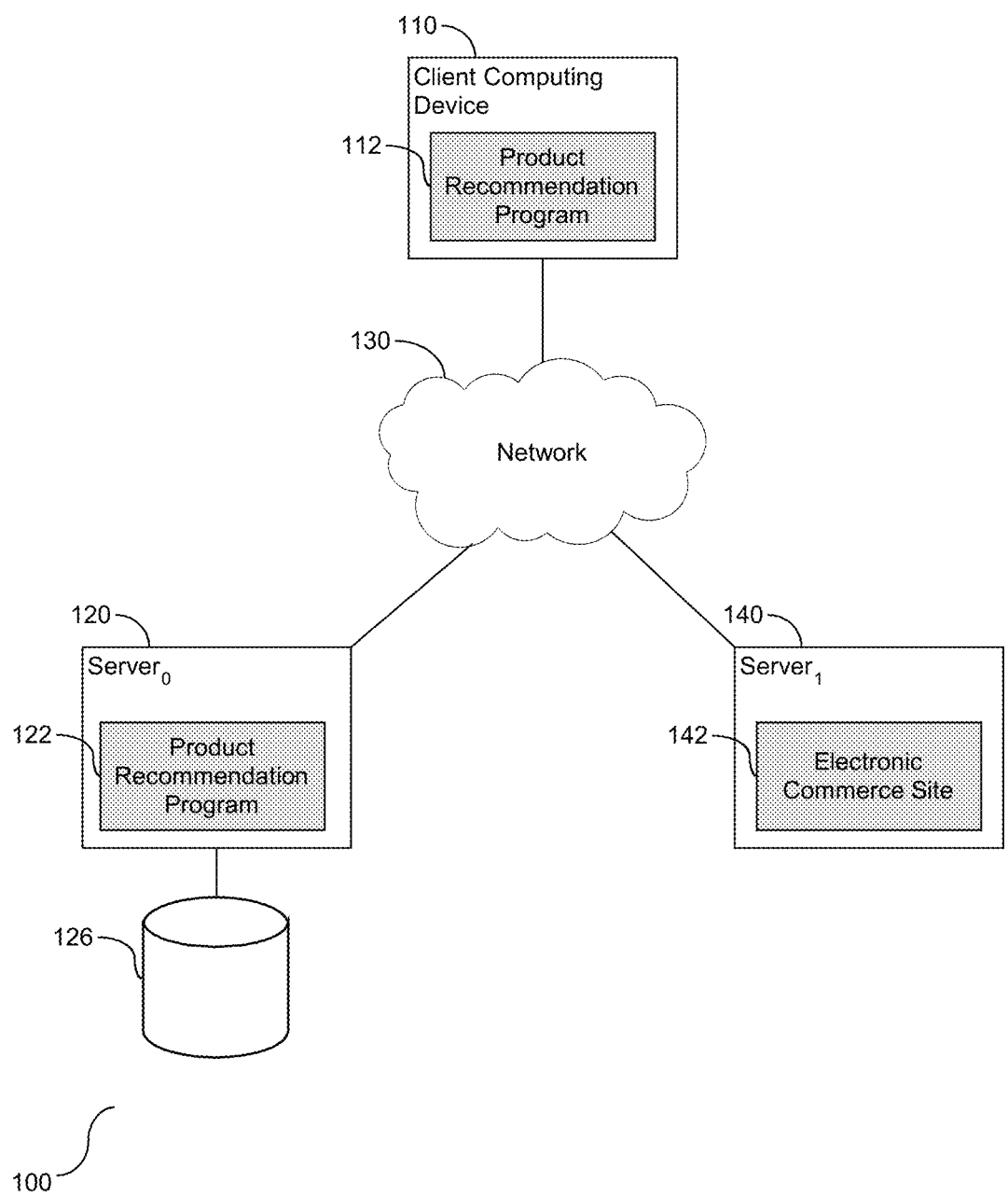
FIG. 1 depicts a system diagram illustrating an exemplary networked computer environment.

Referring to FIG. 1, an exemplary networked computer environment (100) is depicted, in accordance with an embodiment. The networked computer environment (100) may include a client computing device (110) that is enabled to run product recommendation program (112). The networked computer environment (100) may also include servers (120) and (140) in communication with the client computing device (110) across a network (130). $Server_0$ (120) is shown enabled to run a product recommendation program (122) across the network (130). $Server_1$ (140) is shown to enable an electronic commerce site (142) across the network (130). The networked computing environment (100) may include a plurality of client computing devices (110), only one of which is shown for illustrative brevity. Similarly, although two servers (120) and (140) are shown, additional servers may be provided in communication across the network (130). According to at least one embodiment, a repository (126) may be provided operatively coupled to at least one of the servers, shown herein as local to $server_0$ (120), although the location of the repository (126) in the system should not be considered limiting. The communication network (130) may include various types of communication networks, such as a wide area network (WAN), a local area network (LAN), a telecommunication network, a wireless network, a public switched network, and/or a satellite network. It may be appreciated that FIG. 1 provides only an illustration of one implementation and does not imply any limitations with regard to the environments in which different embodiments may be implemented. Many modifications to the depicted environment may be made based on design and implementation requirements.

Client computing device (110) may communicate with servers (120) and (140) via the communication network (130). The communication network (130) may include connections, such as wire, wireless communication links, or fiber optic cables. As discussed below, the servers (120) and (140) may include internal and external components, as shown and described in FIG. 2. Similarly, the client computing device (110) may include internal and external components, as shown and described in FIG. 2. The client computing device may be, for example, a mobile device, a personal digital assistant, a network, a laptop computer, a tablet computer, a desktop computer, or any type of computing device capable of running a program and accessing the network (130).

Servers (120) and (140) may be a laptop computer, netbook computer, personal computer (PC), a desktop computer, or any programmable electronic device capable of hosting the product recommendation program (122) and repository (126), and communicating with client device (110) via the network (130), in accordance with the embodiments. The servers (120) and (140) may include internal and external hardware components, as depicted and described in further detail below with reference to FIG. 2. Servers (120) and (140) may also operate in a cloud computing service model, such as Software as a Service (SaaS), Platform as a Service (PaaS), or Infrastructure as a Service (IaaS) as shown and described in FIGS. 11-13. Servers (120) and (140) may also be located in a cloud computing deployment model, such as a private cloud, community cloud, public cloud, or hybrid cloud.

According to the present embodiment, a program, such as product recommendation program (122) shown local to server (120) may run on the client computing device (110) or on another server operatively coupled to the network (130). The product recommendation program (112) and (122) may identify a product or service within a user captured element, search for related products or services determined to be related to the identified product or service, and present the related products or services to the user. The product recommendation method is explained in further detail below with respect to FIGS. 2-10.

According to the present embodiment, a repository (126) is shown operatively coupled to server$_0$ (120). The repository (126) may contain tags or keywords associated with product images that may be used by product recommendation program (112) and (122) to identify a product or service related to the captured element. Repository (126) may also be a meta-repository. A meta-repository is a repository that incorporates other repositories by references. The repository (126) may also be one or more repositories, only one of which is shown for illustrative brevity, located on one or more servers (120) and (140), only one of which is shown for illustrative brevity.

Figure 2:
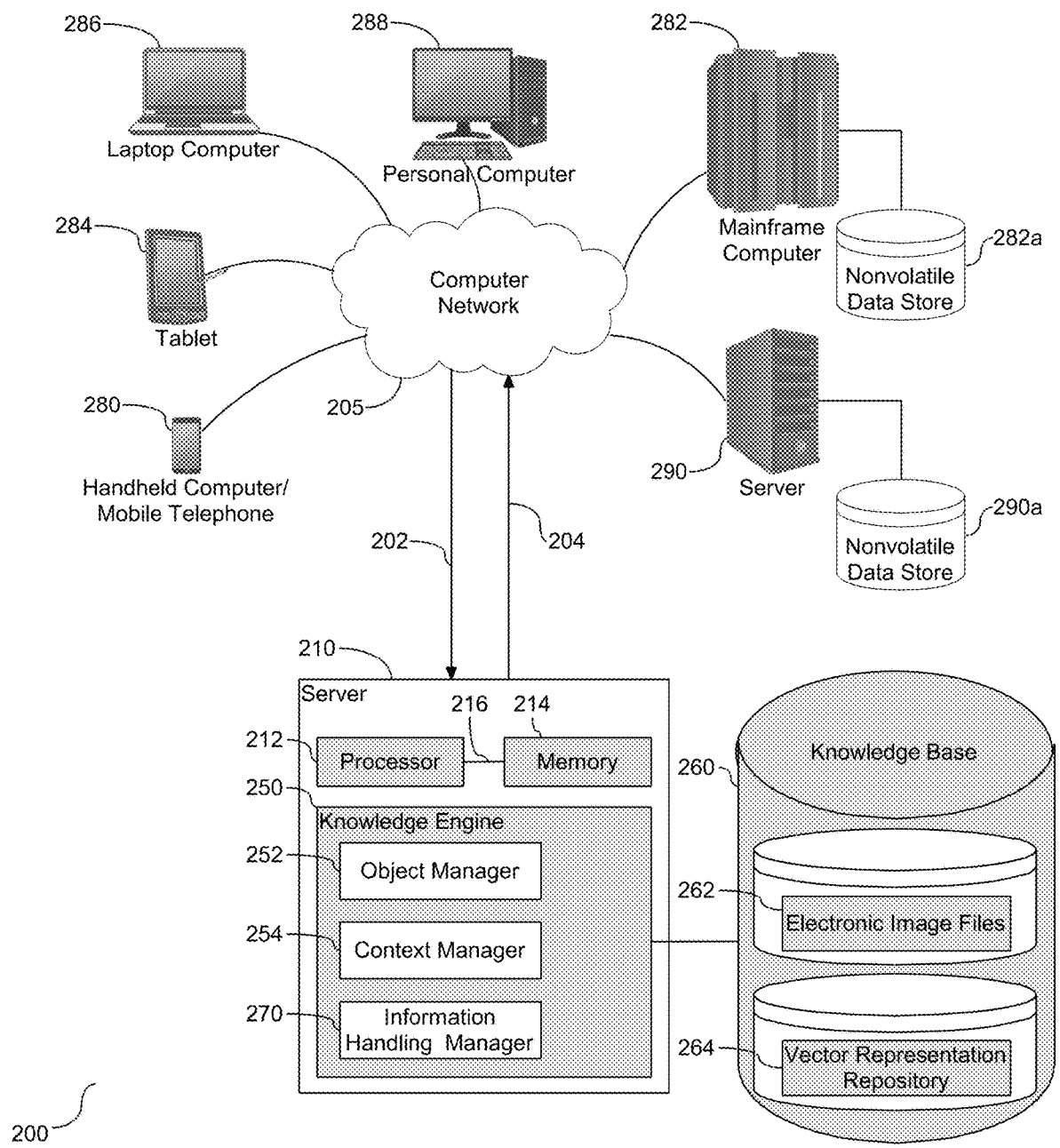
FIG. 2 depicts a system diagram illustrating a schematic diagram of an artificial intelligence system.

Referring to FIG. 2, a schematic diagram of an artificial intelligence system (200) is depicted. As shown, a server (210) is provided in communication with a plurality of computing devices (280), (282), (284), (286), and (288) across a network connection (205). The server (210) is configured with a processing unit in communication with memory across a bus. The server (210) is shown with a knowledge engine (250) for artificial intelligence and/or natural language processing over the network (205) from one or more computing devices (280), (282), (284), (286) and (288). More specifically, the computing devices (280), (282), (284), (286), and (288) communicate with each other and with other devices or components via one or more wired and/or wireless data communication links, where each communication link may comprise one or more of wires, routers, switches, transmitters, receivers, or the like. In this networked arrangement, the server (210) and the network connection (205) may enable digital image recognition and resolution for one or more products or services. Other embodiments of the server (210) may be used with components, systems, sub-systems, and/or devices other than those that are depicted herein.

The knowledge engine (250) may be configured to receive input from various sources. For example, knowledge engine (250) may receive input from the network (205), one or more knowledge bases of corpus (260) of electronic image files or file repositories (262), image and vector representation repositories (264), or other data, content users, and other possible sources of input. In selected embodiments, the knowledge base (260) also referred to herein as corpus, may include structured, semi-structured, and/or unstructured content that are contained in one or more knowledge data sources or corpi. The various computing devices (280), (282), (284), (286), and (288) in communication with the network (205) may include access points s. Some of the computing devices may include devices for a data source storing the corpus of data as the body of information used by the knowledge engine (250) to generate product or service recommendation output (204). The network (205) may include local network connections and remote connections in various embodiments, such that the knowledge engine (250) may operate in environments of any size, including local and global, e.g. the Internet. Additionally, the knowledge engine (250) serves as a front-end system that can make available a variety of knowledge extracted from or represented in electronic image files, network accessible sources and/or structured data sources. In this manner, some processes populate the knowledge engine (250) with the knowledge engine (250) also including input interfaces to receive requests and respond accordingly.

As shown, content may be in the form of one or more electronic image files in the image and vector repositories (262) and (264), respectively, for use as part of the corpus (260) of data with the knowledge engine (250). The corpus (260) may include any structured and unstructured image files (262). The corpus (260) may also include structured and unstructured non-image files (264), including but not limited to any file, text, article, or source of data (e.g. scholarly articles, dictionary, definitions, encyclopedia references, feedback data, commentary, and the like) for use by the knowledge engine (250). Content users may access the knowledge engine (250) via a network connection or an internet connection to the network (205), and may submit natural language input to the knowledge engine (250) that may effectively translate the non-image file(s). As further described below, when a process evaluates a given section of a document for semantic content, the process can use a variety of conventions to query it from the knowledge engine (250). Semantic content is content based on the relation between signifiers, such as words, phrases, signs, and symbols, and what they stand for, their denotations, or connotation. In other words, semantic content is content that interprets an expression, such as by using Natural Language (NL) processing. In one embodiment, one or more of the various computing devices (280)-(290) sends well-formed content (202), e.g. natural language text, to the knowledge engine (250), so that the content (202) may be interpreted and the knowledge engine (250) may provide a response in the form of one or more outcomes (204). In one embodiment, the knowledge engine (250) may provide a response in the form of a ranked list of outcomes (204). The knowledge engine (250) together with the embedded tools (252), (254), and (270) work with the knowledge base (260) to converge on a directed outcome with minimal iterations of object interaction.

In some illustrative embodiments, server (210) may be the IBM Watson™ system available from International Business Machines Corporation of Armonk, N.Y., which is augmented with the mechanisms of the illustrative embodiments described hereafter. The IBM Watson™ knowledge manager system may receive input content (202) which it then parses to extract the features or characteristics of the content (202) that in turn are then applied to the corpus of data stored in the knowledge base (260). Based on application of the content (202) to the corpus of data, a set of candidate outcomes are generated by looking across the corpus of data for portions of the corpus of data that have some potential for containing a matching or complementary pattern and associated object or object file to the submitted content (202).

Received content (202) may be processed by the IBM Watson™ server (210) which performs analysis on the input content (202) and the language used in each of the portions of the corpus of data found during application of the content using a variety of reasoning algorithms. There may be hundreds or even thousands of reasoning algorithms applied, each of which performs different analysis, e.g., comparisons, and generates a score. The algorithms are directed at image representation, text representation, flow similarity, and adaptive attention.

Scores obtained from the various algorithms indicate the extent to which the potential response (204) is inferred by the input content (202) based on the specific area of focus of that reasoning algorithm. The adaptive attention algorithm captures how well the reasoning algorithm performed at establishing an inference between two similar products and associated object image files for a particular domain in real-time.

The adaptive attention aspect may be separate from or in conjunction with natural language processing. With respect to the natural language processing, the system (210) may include an information handling manager (270) to identify and analyze non-image based data, such as textual data, by detecting and categorizing text data and associated textual patterns, generating and/or identifying characteristics for each detected pattern from characteristic metadata for terms in the pattern, and associating the generated characteristic(s) with the image file(s) and associated image data. Though shown as being embodied in or integrated with the server (210), the information handling manager (270) may be implemented in a separate computing system (e.g., 290) that is connected across network (205) to the server (210). Wherever embodied, the information handling manager (270) facilitates natural language processing in conjunction with the image processing facilitated by the knowledge engine (250) to create a relationship between text characteristic data and image files, and identify potential similar object images and image files, based on characteristic metadata.

As shown, the knowledge engine (250) includes an object manager (252) and a context manager (254). The object manager (252) utilizes an object detection algorithm to identify image objects and associated image object files. In one embodiment, the image objects are digital representations in a visual display of a physical product. The object manager (252) functions to convert the image or image file to a mathematical representation in the form of one or more vectors, and produces a tensor representation of each image object. The tensor representation is a multi-feature mathematical representation, e.g. multi-vector representation, of object image features. It is understood that an object may be comprised of multiple-components, and the image representation of the object represents the object and the multiple components thereof. Accordingly, the tensor representation of a multi-component object produces a tensor representation of each image representation of the object components by the object manager (252).

The information handling manager (270) utilizes natural language processing to identify non-structure object features. The information handling manager (270) is shown operatively coupled to the object manager and functions to relate or identify a relation or association of the identified non-structured object feature(s) to structured object features identified by the object manager (252). In addition to the feature identification, the information handling manager (270) converts identified non-structure object features to a structured format, such as a vector map. In one embodiment, the information handling manager (270) utilizes natural language processing to convert the identified non-visual objects into one or more language components, and in one embodiment, further identifies a category for each language component. The object manager (252) communicates with the information handling manger (270) in the tensor representation by incorporating the vector representation of the non-structured object feature(s) in the tensor. Accordingly, similar to the structured object features, the non-structured object features are converted to a mathematical representation and are incorporated into the tensor representation.

The context manager (254) utilizes the tensor representation created by the object manager (252) to extract vectors corresponding to visual features represented by an image object attribute combination. The context manager (254) applies a vector similarity algorithm against one or more corresponding vectors of one or more related, or in one embodiment non-related, object images, and further extracts a similar vector for one or more similarly classified image objects represented in the knowledge base (260). In one embodiment, the context manager (254) applies a vector similarity algorithm to identify and extract similarly classified objects. The algorithm may be applied continuously by the context manager (254) to incorporate the non-structured object features. For example, in one embodiment, the context manager (254) conducts a dynamic re-assessment based on received, e.g. new, non-structured object features. The context manager (254) consults the image and vector repositories (262) and (264), respectively, to identify and extract a similar vector for each assessed structured and non-structured object features. Each represented image object is a physical component within or associated with the object.

As shown and described, the context manager (254) functions to assess multi-visual contextual similarity. More specifically, the context manager (254) creates or presents output data in the form of similarity context. In one embodiment, the context manager ranks the identified similar object based on the returned similarity context. The context manager (254) identifies or selects a product image to be displayed. The selection includes a dynamic re-assessment of similarity context based on proximity of the tensor representation of the selected product image or image component file to the tensor representation of the related object image file(s). It is understood that when a plurality of images are presented and one image is selected, at least one image is non-selected. The ranking that is conducted by the context manager (254), adjusts the ranking of the non-selected object images, which includes re-assessment of proximity of each non-selected object tensor to the selected object tensor. The assessment and ranking conducted by the managers (252) and (254) function to converge to a final product based on the similarity of evaluated object aspects. Accordingly, the object manager (252) and the context manager (254) facilitate the convergence through mathematical representation and assessment of object images and associated image files.

As shown and described, the information handling manger (270) functions to address natural language processing. More specifically, the information handling manager (270) is configured to apply NL processing to detect a source text segment, parse terms in the source segments, and map the parsed terms and phrases from the natural language input into one or more potential patterns, which in one embodiment may be in the form of analogical patterns. As described herein, the information handling manager (270) may perform a sentence or phrase structure analysis to parse sentences and denote connected terms. For example, the information handling system may use a linguistic parser, such as a Slot Grammar Logic (SGL) parser, to perform parse of a source sentence to detect one or more specified patterns (e.g., "[noun] [verb] like [x] as a [y]" or variations thereof, such as "[noun] [verb phrase] [comparator] [adjective] [noun phrase]"). The information handling manager (270) may also be configured to apply one or more learning methods to match a detected pattern to known patterns to decide and categorize the source language converted to text.

The information handling manger (270) may use the detected pattern(s) to search the corpus or knowledge database (260) for matching references to provide evidence for possible meaning to the source non-structured image object(s). Retrieved evidence references may then be processed to a vector representation for incorporation into an associated tensor. To support the vector representation, the information handling manager (270) may also use the words in the definition or meaning of the identified term(s) in addition to major characteristics associated with the term(s) to assist in assignment and resolving a term.

Types of information handling systems that can utilize server (210) range from small handheld devices, such as handheld computer/mobile telephone (280) to large mainframe systems, such as mainframe computer (282). Examples of handheld computer (280) include personal digital assistants (PDAs), personal entertainment devices, such as MP4 players, portable televisions, and compact disc players. Other examples of information handling systems include pen, or tablet, computer (284), laptop, or notebook, computer (286), personal computer system (288), and server (290). As shown, the various information handling systems can be networked together using computer network (205). Types of computer network (205) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate non-volatile data stores (e.g., server (290) utilizes nonvolatile data store (290a), and mainframe computer (282) utilizes nonvolatile data store (282a). The nonvolatile data store (282a) can be a component that is external to the various information handling systems or can be internal to one of the information handling systems.

Figure 3:
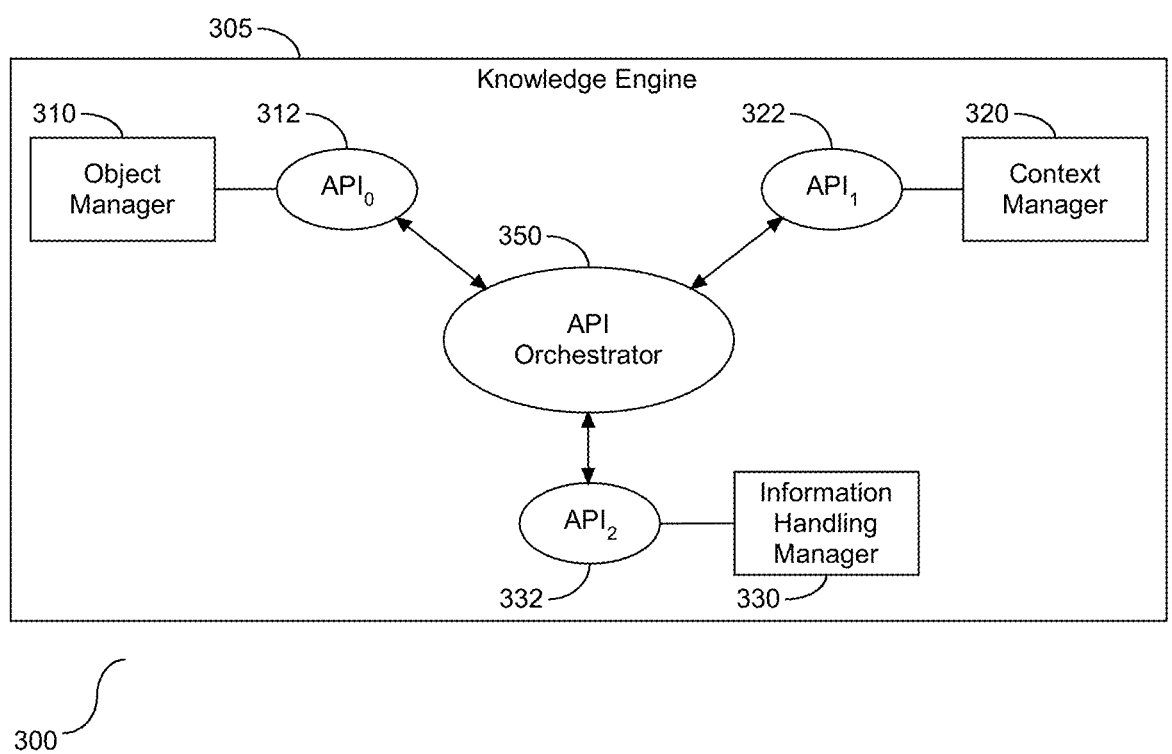
FIG. 3 depicts a block diagram illustrating the processing tools shown and described in FIG. 2 and their associated APIs.

The visual and non-visual object identification and assessment may be accessed via API administration or orchestration platforms, as shown and described in FIG. 3, and natural language input received via an NLU input path. Referring to FIG. 3, a block diagram (300) is provided illustrating the image object and NL processing tools and their associated APIs. As shown, a plurality of tools are embedded within the knowledge engine (305), with the tools including the object manager (310) associated with $API_0$ (312), the context manager (320) associated with $API_1$ (322), and the information handling manager (330) associated with $API_2$ (332). Each of the APIs may be implemented in one or more languages and interface specifications. $API_0$ (312) provides for the functionality associated and supported by the object manager (352); $API_1$ (322) provides for the functionality associated and supported by the context manager (354); and $API_2$ (332) provides for the functionality associated and supported by the information handling manager (370). As shown, each of the APIs (312), (322), and (332) are operatively coupled to an API orchestrator (350), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
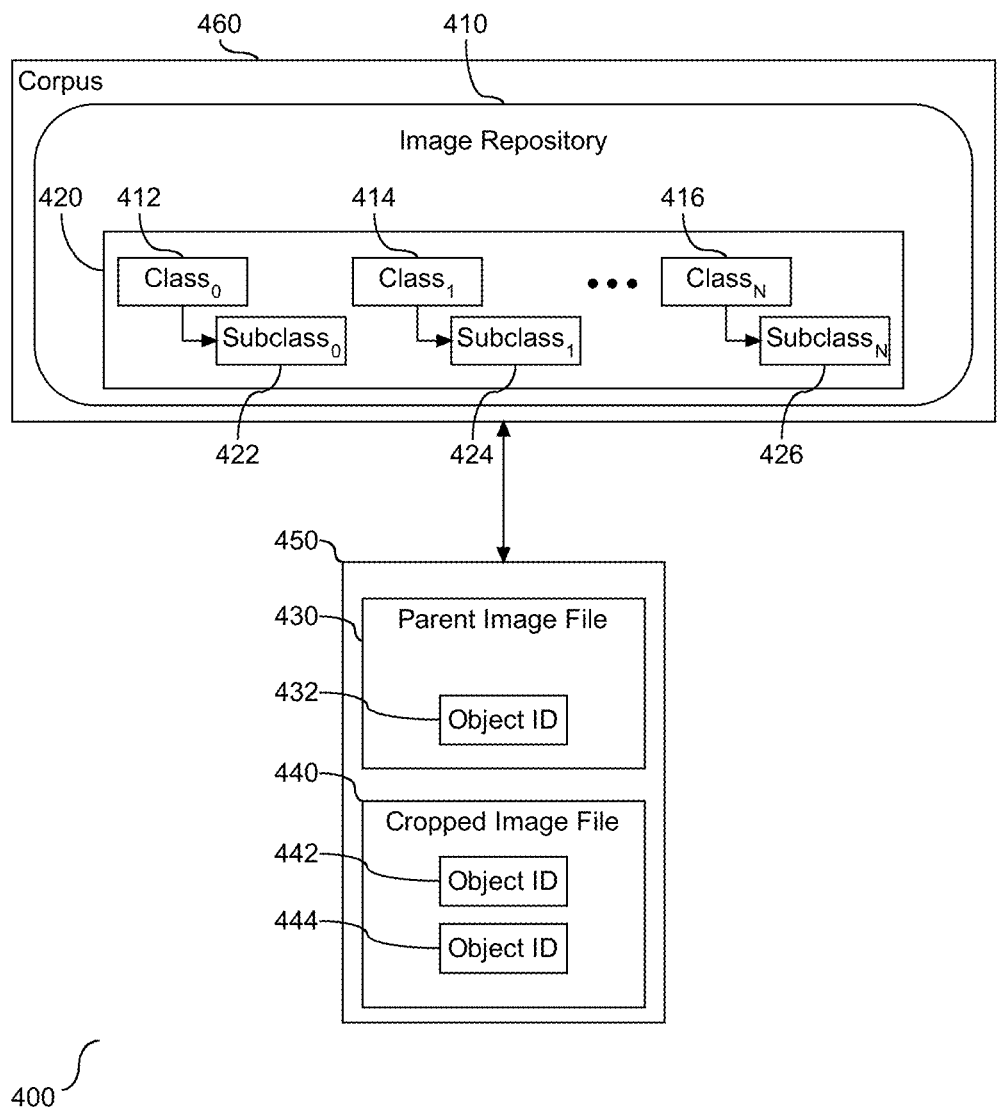
FIG. 4 depicts a block diagram illustrating an information handling system for image representation.

Referring to FIG. 4, a block diagram (400) is provided illustrating an information handling system for image representation. An image repository (410) is populated with image files and associated image file metadata, and in one embodiment is referred to as a training repository. In one embodiment, the image repository is a part of the corpus (460). As shown, the repository (410) is shown to store a plurality of digital images. In one embodiment, the repository is organized into layers of a hierarchy or taxonomy (420), with each layer defining a class or sub-class defining a category for the stored images. For example, the repository (410) is shown with classes of with the layers of the hierarchy, shown herein as $class_0$ (412), $class_1$ (414), and $class_N$ (416), and each class having at least one sub-class, shown as $sub\text{-}class_0$ (422), $sub\text{-}class_1$ (424), and $sub\text{-}class_N$ (426), respectively. Although only three classes and one sub-class in each class are shown, this is merely for illustrative purposes and should not be considered limiting. Stored image(s) files may be a single image entity, or in one embodiment may be a cropped portion of another image being stored as a separate digital image file, which in one embodiment, may be stored in an appropriately defined subclass (422), (424), or (426) in the taxonomy (420). Accordingly, each image file is assigned to at least one class and/or sub-class in the repository (410).

Image files may be classified as a parent image or a child image, e.g. cropped image. Two different classes of images in the image repository (410) are shown and described. An example parent image file and cropped image file are shown at (450), including a parent image file (430) and a cropped image file (440), also referred to herein as a child image. Each image file (430) and each cropped image file (440) is shown with an object identifier (432) and (442), respectively. The child file (440) includes an additional object identifier (444) referencing the parent image file (430) and defining the child file (440) as including at least a component of the parent image file (430). Each image represented herein, such as image files (430) and (440), include additional metadata stored in the respective image file, including, but not limited to, size, scale, color intensity, etc. Such metadata is also referred to herein as raw image features.

Figure 5:
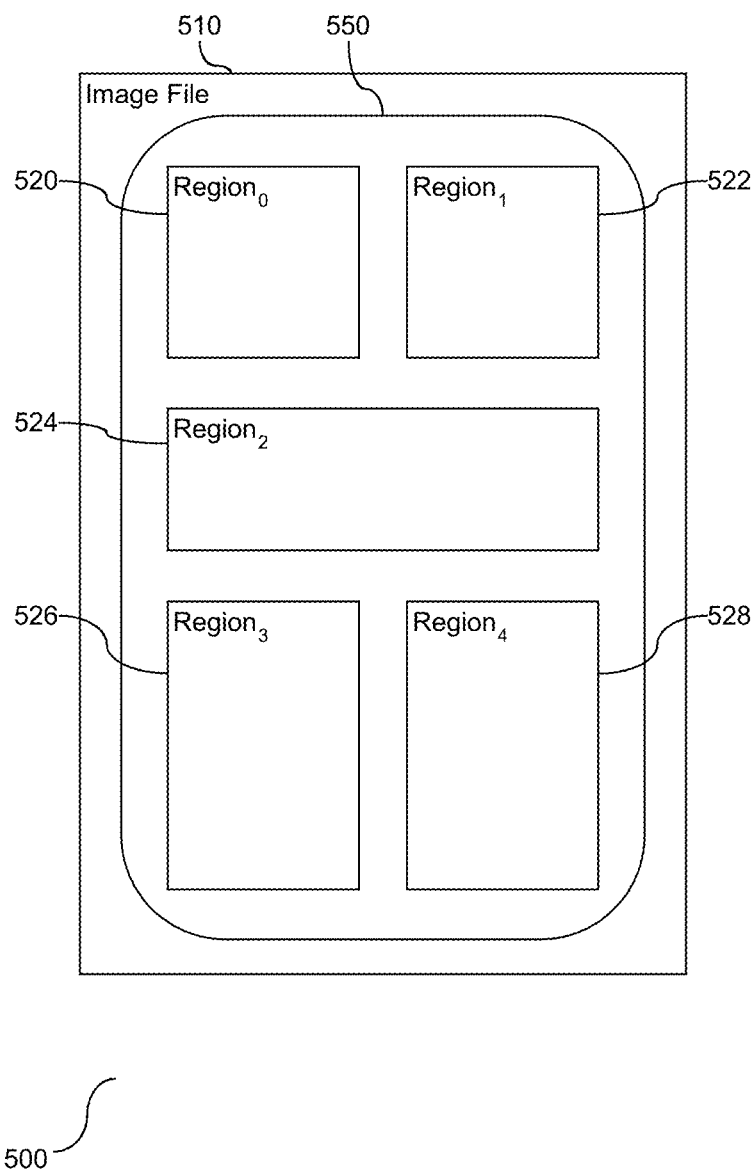
FIG. 5 depicts a block diagram illustrating an image file and cropped regions.

As shown in FIG. 4, an image data repository organizes and stores image files. An image file may be in the form of a cropped image representing a region of a parent image depicting a concept pertaining to a subcategory. Referring to FIG. 5, a block diagram (500) is provided illustrating an image file and cropped regions. As shown, an image file (510) contains a parent image (550) with five cropped regions shown herein as $region_0$ (520), $region_1$ (522), $region_2$ (524), $region_3$ (526), and $region_4$ (528). The quantity of cropped regions is for illustrative purposes and should not be considered limiting. It is understood that each cropped region represents a concept within the parent image (550). As shown, both the parent image (550) and the cropped regions (520)-(528) are represented in the image file (510), with each cropped region being cross-referenced to its associated parent image, as shown and described with the object identifiers in FIG. 4.

Figure 6:
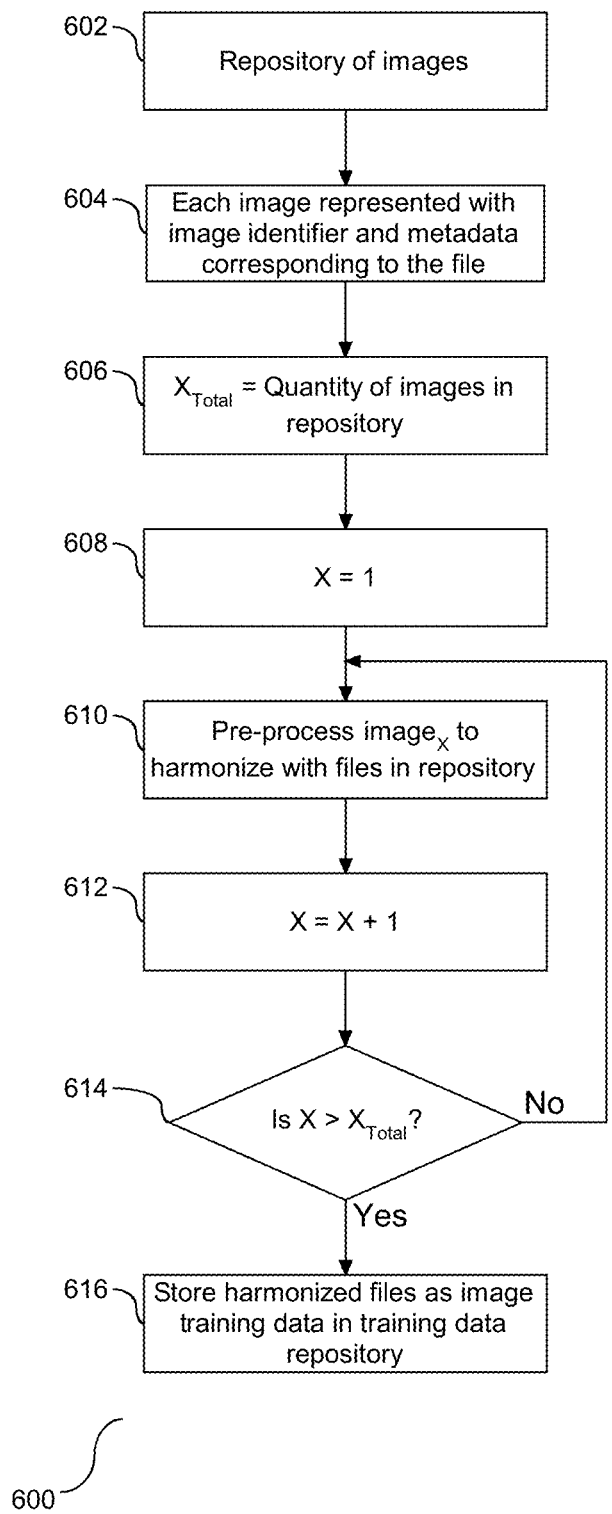
FIG. 6 depicts a flow chart illustrating image file representation.

Referring to FIG. 6, a flow chart (600) is provided illustrating image file representation. The repository consists of images from different categories of classes from one or more sources (602). Each image in the image repository includes an image identifier and metadata corresponding to the file (604). In one embodiment, the image identifier is a part of the image metadata. Examples of image metadata include, but are not limited to, class, source, category, object, material, price, trend, and social media. Each image metadata attribute become a training attribute that may be utilized under different training and similarity iterations. The quantity of images in the image repository is assigned to the variable $X_{Total}$ (606), and an associated image counting variable is initialized (608). Each image, $image_X$, in the repository is pre-processed to harmonize the files in the repository with respect to size, scale, and intensity (610). Following the harmonization, the image counting variable is incremented (612) and it is determined if all of the images have been assessed and harmonized (614). A negative response is followed by a return to step (610), and a positive response is followed by storing the harmonized files as image training data in a training data repository (616). Accordingly, the images files are processed for harmonization and stored as image training data in a repository, or in one embodiment, the corpus (260).

Figure 7:
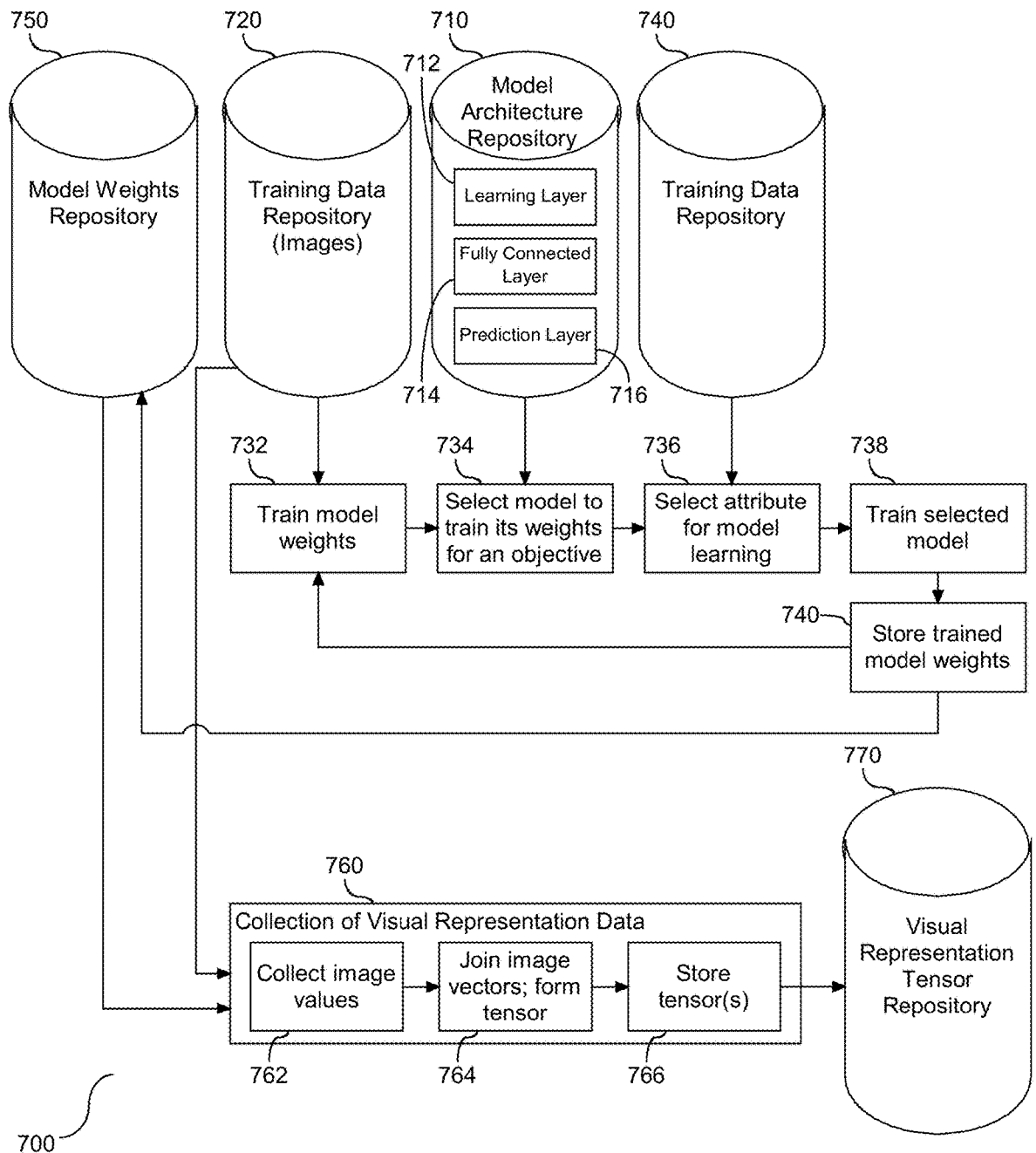
FIG. 7 depicts a process flow illustrating image representation and training.

Referring to FIG. 7, a process flow (700) is provided illustrating image representation and training. As shown, a model architecture repository (710) is provided with one or more fully layers representing image features. Each layer produces one or more mathematical representation of image features in the form of vectors, thereby quantifying image understanding and classification for similarity computation. The layers are shown in the model architecture repository (710), including learning layer (712), a fully connected layer (714) and a prediction layer (716). The learning layer (712) is utilized for normalization; the fully connected layer (714) summarizes the learning in a linear multi-dimensional vector; and the prediction layer (716) is utilized for classification and predicting class labels. The process flow utilizes the image training data from the training data repository (720) to obtain training data for training model weights (732). The training data repository (720) is directed at images representing objects and cropped objects. The aspect of populating the training data repository is shown and described in FIG. 6. The process flow utilizes the model architecture repository (710) to select a model to train its weights for a given objective (734). An image attribute is selected for model learning and to differentiate images across the selected attribute (736). Examples of the image attribute includes, but are not limited to, price, source, age, etc. The selected image attribute is provided in an associated training metadata repository (740). In one embodiment, the training data repository (740) provides metadata, classes, and scores, and as such provides a different aspect of data then training data repository (720). Although repository (720) and (740) are shown herein as separate units, in one embodiment, they may be a single physical element. Accordingly, the process flow utilizes multi-dimensional aspects of the image data.

Following the attribute selection at (736), the selected model is trained to differentiate, or in one embodiment classify or predict, the selected attribute across a plurality of images in the form of model weights (738). Trained model weights are stored against the model architecture and the associated layers (712)-(716) and combination of all attributes it is trained on, and the timestamp to which the training corresponds in a model weight repository (750). The process returns to step (732) to repeat the process for each model architecture and attribute combination. In one embodiment, the training may not succeed in yielding satisfactory evaluation or performance criteria. Each successful training data is identified in the training metadata repository together with a timestamp (720).

As further shown, visual representation data is collected for each image or image object (760) utilizing the training image data repository (720) and the model weight repository (750). For each model, image values are collected from the last output layer across all the images in the catalogue or image source (762). The image values include trained attribute data for each of the image attributes. In one embodiment, the image values are in vector form. The vectors are joined to form a tensor, e.g. a multi-dimension vector, corresponding to a visual representation of that image from a different perspective (764). In one embodiment, each dimension in the tensor corresponds to a model-attribute combination. The tensors are stored against the respective image, including the object identifier(s), along with the timestamp reflecting when the models were trained, in the visual representation tensor repository (766). The vectors within each tensor represent different models and attribute vectors. Each vector contains scores obtained from the last fully connected layer for the given model and attribute for which it is trained. As shown, the tensors are stored in a visual representation tensor repository (770). Accordingly, each image and its associated attributes are processed for representation in vector form and stored in the tensor repository.

Figure 8A:
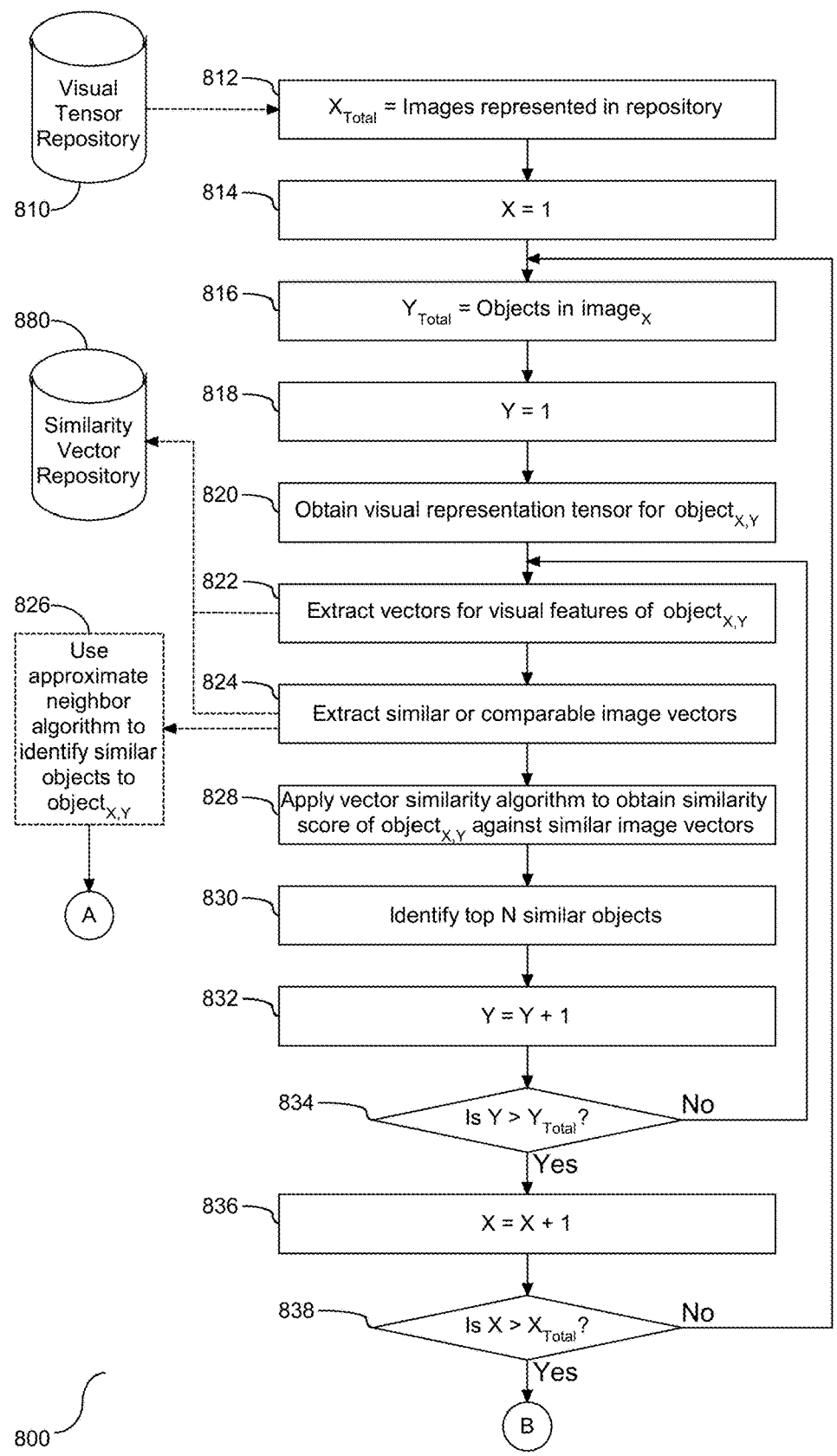
FIGS. 8A and 8B depict a flow chart illustrating a process for utilizing the image representation for computing similarity.
Figure 8B:
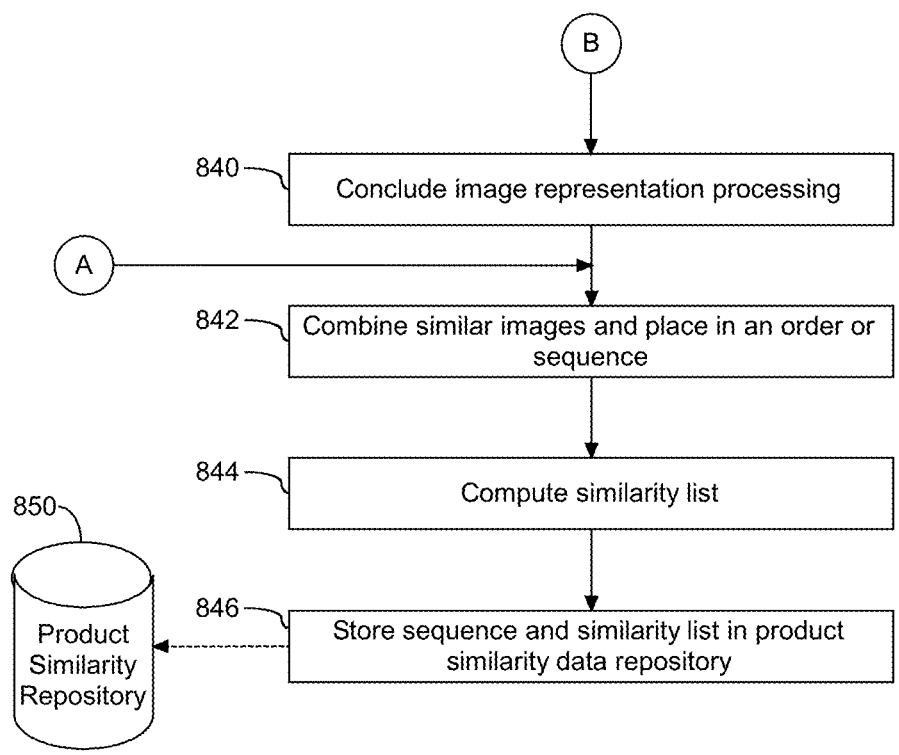

As shown in FIG. 7, the images are processed for image representation. Referring to FIGS. 8A and 8B, a flow chart (800) is provided illustrating a process for utilizing the image representation for computing similarity. Each object image file employs a tensor representation of each image object. The tensor is a multi-feature mathematical representation of object image features, with each object feature being a physical component represented within the object. A visual representation tensor repository (810) is shown and utilized herein. See FIG. 7 for population of the repository (810). The repository stores tensors against respective image identifiers, parent and/or child image identifiers, along with a corresponding timestamp referencing when the models were trained. Each tensor is comprised of two or more vectors, with each vector being a mathematical representation of image data. The vectors that comprise the tensor represent different models and attribute vectors. The variable $X_{Total}$ represents a quantity of images represented in the repository (812), and an associated image counting variable, X, is initialized (814). Each image represented by the image identifier is comprised of one or more objects. For each image, $image_X$, the quantity of objects are identified $Y_{Total}$, (816) and an associated object counting variable, Y, is initialized (818). A visual representation tensor is obtained for $object_{X,Y}$ (820) and the vectors corresponding to the visual features of $object_{X,Y}$ are extracted (822). Accordingly, for each image in the data repository, the associated tensor is obtained and the visual features represented in the tensor are extracted.

Using the object and image identifiers, one or more similar image vectors in the same or a comparable taxonomy layer or class are extracted (824). In one embodiment, the object, model, and attribute identifiers are employed to identify similar objects. In another embodiment, an approximate nearest neighbor algorithm, or an alternative optimization computation is utilized to identify similar objects to $object_{X,Y}$ (826). Following step (824), a vector similarity algorithm is applied to obtain a similarity score of $object_{X,Y}$ against extracted and similar image vectors (828), e.g. against corresponding vectors of other products in the same category. In one embodiment, a mean, weighted mean, or other means, are utilized, and in one embodiment combined, into a single score. The top N similar objects are identified based on the mathematical assessment (830), where N represents a maximum number of similar objects to be communicated or presented. In one embodiment, the variable N is configurable. The object variable Y is incremented (832), and it is determined if all of the objects for the image have been processed (834). A negative response to the determination at step (832) is followed by a return to step (822), and a positive response is followed by an increment of the image counting variable (836). It is then determined if each of the images in the repository have been processed (838). A negative response to the determination at step (838) is followed by a return to step (816), and a positive response concludes the image representation processing (840). Accordingly, the vectors in each image and each image object are processed to identify similar images and image objects.

Similar images and/or image-objects are identified for each image in the repository. Following the conclusion of the image representation processing at step (838) or following step (826), the identified similar images are combined and placed in an order, which in one embodiment is referred to herein as a sequence, (842), of the top N similar objects. A position in the sequence corresponds to a fixed combination of the object, model, and attribute identifiers. The top N similar products identified at step (842) are referred to as a top N product list. In addition, a similarity list is computed at step (844), also referred to herein as a list of lists or a multi-dimension vector. The similarity list at step (844), also referred to herein as a top product list, is based on a corresponding top N computation of product, object, model, and attribute identifiers. The lists created at steps (842) and (844) are stored in an associated product similarity repository (846), with the repository shown herein as (850). Similarly, the vectors extracted at steps (822) and (824) are stored in a similarity feature vector repository (880). This repository contains the two dimension vector of similarity scores of each product with other products. In one embodiment, a first dimension corresponds to other product identifiers with which the similarity is compared, and a second dimension corresponds to vectors of the combination of object, model, and attribute identifiers against which the similarity score is stored for a given product identifier against other product identifiers. Accordingly, two different categories of data from the similarity computation are stored in associated repositories, shown herein as a product similarity repository and a similarity feature vector repository.

Figure 9A:
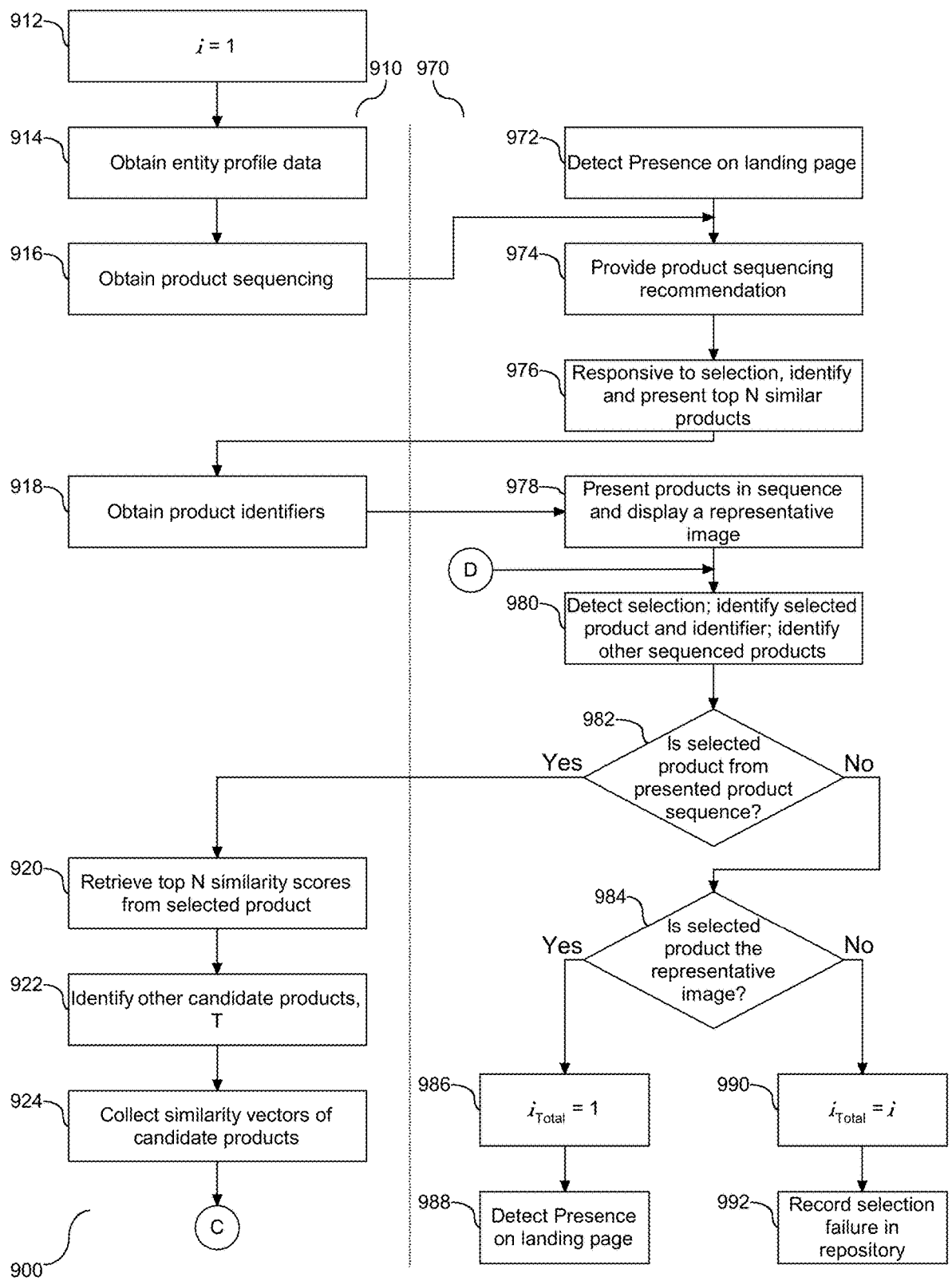
FIGS. 9A and 9B depict a flow chart illustrating an adaptive attention similarity process.
Figure 9B:
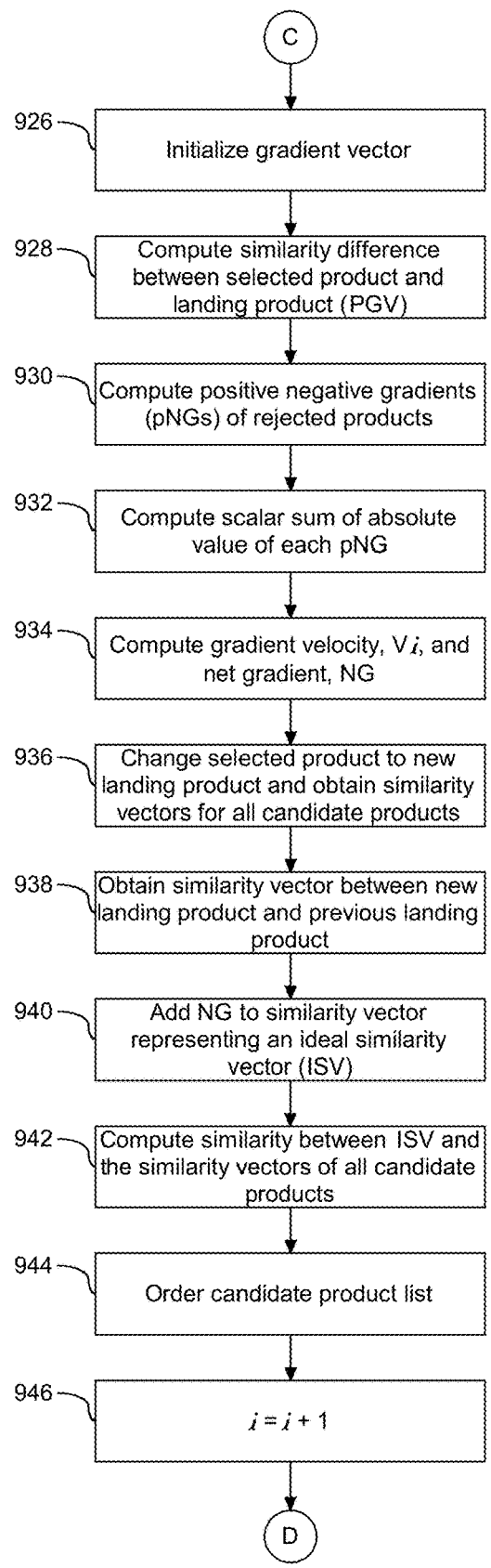

Both the product similarity and vector similarity stored in the corresponding repository are utilized in real-time to identify similar products of interest. Referring to FIGS. 9A and 9B, a flow chart (900) is provided illustrative an adaptive attention similarity process. As shown, there are two semi-parallel algorithms (910) and (970). Algorithm (910) refers to a computation and algorithm (970) refers to an associated display portal, also referred to herein to convey product identification on a visual display. An iteration counting variable, i, is initialized (912), and an entity, also referred to herein as a user, is logged in to a network and their profile data is obtained (914). The profile data may include, but is not limited to, purchases, customer relationship management (CRM) data, location, geography, browser, etc. As the entity identifies a product, or in one embodiment a service, of interest, a sequencing and recommendation algorithm is utilized to obtains product sequencing for the identified product for an associated subcategory (916). In an alternative to step (914), the entity may be detected to have landed on a product landing page for a given sub-category of electronic commerce (972). Following either step (916) or step (972), a product sequencing recommendation is provided to the entity (974). At such time as the entity selects a product, the top N similar product to the selected product are obtained and presented to the entity (976). See FIGS. 8A and 8B for the details directed at identifying the top N similar products. According, the first aspect of the attention similarity process utilizes the similar product algorithm shown and described in FIGS. 8A and 8B.

Following step (976), the product identifiers are obtained for each of the presented similar products (918), e.g. the identifiers for the top N similar products. In one embodiment, the product identifiers are obtained from the product similarity repository, see FIGS. 8A and 8B. The selected products are presented to the entity in sequence, and a representative image of the top N similar products is also presented (978). At such time as the entity makes a selection on one of the representative images, the selected product is identified together with its product identifier, and other products sequenced before the selected product but not selected for the iteration are also identified together with their respective product identifiers (980). It is then determined if the selected product at step (980) is one of the images in the presented product sequence, e.g. from the top N similar products, (982). A negative response to the determination at step (982) is followed by determining if the product from the product landing page was the subject of the selection at step (984). A positive response to the determination at step (984) is followed by identifying the quantity of steps employed in the selection process, i, (986) and storing the entity and associated interaction data in an associated repository (988). Similarly, a negative response to the determination at step (984) is followed by identifying the quantity of steps employed in the selection process, i, (990) and recording the selection process as a failure in an associated repository (992).

It is shown that a positive response to the determination at step (982) is an indication that the similarity product presentation is being considered by the active entity. The top N similarity scores from the selected product are retrieved (920). Thereafter, other candidate products, T, are identified (922). The candidate products are selected based on similarity to the top N products. In one embodiment, the quantity of candidate products T is greater than the top N identified products, e.g. T>N. A default priority of the T products is based on the following normalized weight score of a product of the similarity of the base product with the candidate parent product and the similarity of the candidate product with its parent product. Leveraging the similarity feature vector repository, the similarity vectors of all the candidate products are collected for this base product (924). A vector, also referred to herein as a gradient vector, is initialized with a length assigned to a length of the similarity vectors (926). Thereafter, a difference in similarity between the selected product and the landing product on the page the selected product was presented is computed (928). In one embodiment, the computed difference is referred to as a positive gradient vector (PGV). All the positive negative gradients (pNGs) are computed as the difference in similarity vector of each of the rejected products (930), e.g. difference between the candidate similar products and the landing product. In one embodiment, there is more than one rejected product. In one embodiment, at step (930) a dot product is computed for each pNG vector with a relevance vector (RV), where the RV is computed as follows:

$$\text{Mod}[-1*\text{dot}((PGV.pNG)/\text{abs}(\text{dot}(PGV.pNG))]$$

Each element of RV is 0 if the sign of corresponding element of PGV and pNG are the same, and is 1 if their signs are different. In addition to the dot product computation at step (930), a scalar sum of the absolute value of each pNG as their weights is computed (932). The scalar sum computation includes to standardize the weights to add to 1 (Sn), and to take the weighted average, e.g. weights as Sn corresponding to each pNG, of the pNGs to make a negative gradient vector (NGV), which is standardized.

Both the PGV and the NGV have an associated learning rate. The variable Lp represents the learning rate for the PGV, and the variable Ln represents the learning rate of NGV. Similarly, the variable Ed represents an exponential decay coefficient for gradient velocity for each interaction step. Following step (932), the gradient velocity, Vi, is computed (934) for this iteration as:

$$Vi=Lp*PGV-Ln*NGV$$

and the net gradient is computed as:

$$NG=Ed*Vi-1+(1-Ed)*Vi$$

where Vi−1 is a velocity vector from a previous iteration. Following the computations at steps (932) and (934), the selected product is changed as the new landing product and the similarity vectors for all candidate products corresponding to the new landing product are obtained (936). In addition, the similarity vector between the new landing product and the previous landing product is obtained (938) and the NG is added to the similarity vector to represent the idea similarity vector (ISV) (940). The similarity between the ISV and the similarity vectors of all candidate products is computed with the primary key product identifier being the product identifier of the new landing product (942). Thereafter, the product identifiers in the candidate product list are placed in an order of similarity, e.g. higher similarity ranked higher, and the list is presented as a suggested product list for the new landing page of the previously selected product (944). An iteration shown in the above-described steps is directed at similarity assessments for a landing product and selection of any products identified as being similar. Following the above-described iteration, the iteration counting variable, i, is incremented (946), followed by a return to step (980) for any subsequent product selections. Accordingly, each iteration shown and described dynamically adapts to product selection and product similarity.

Figure 10:
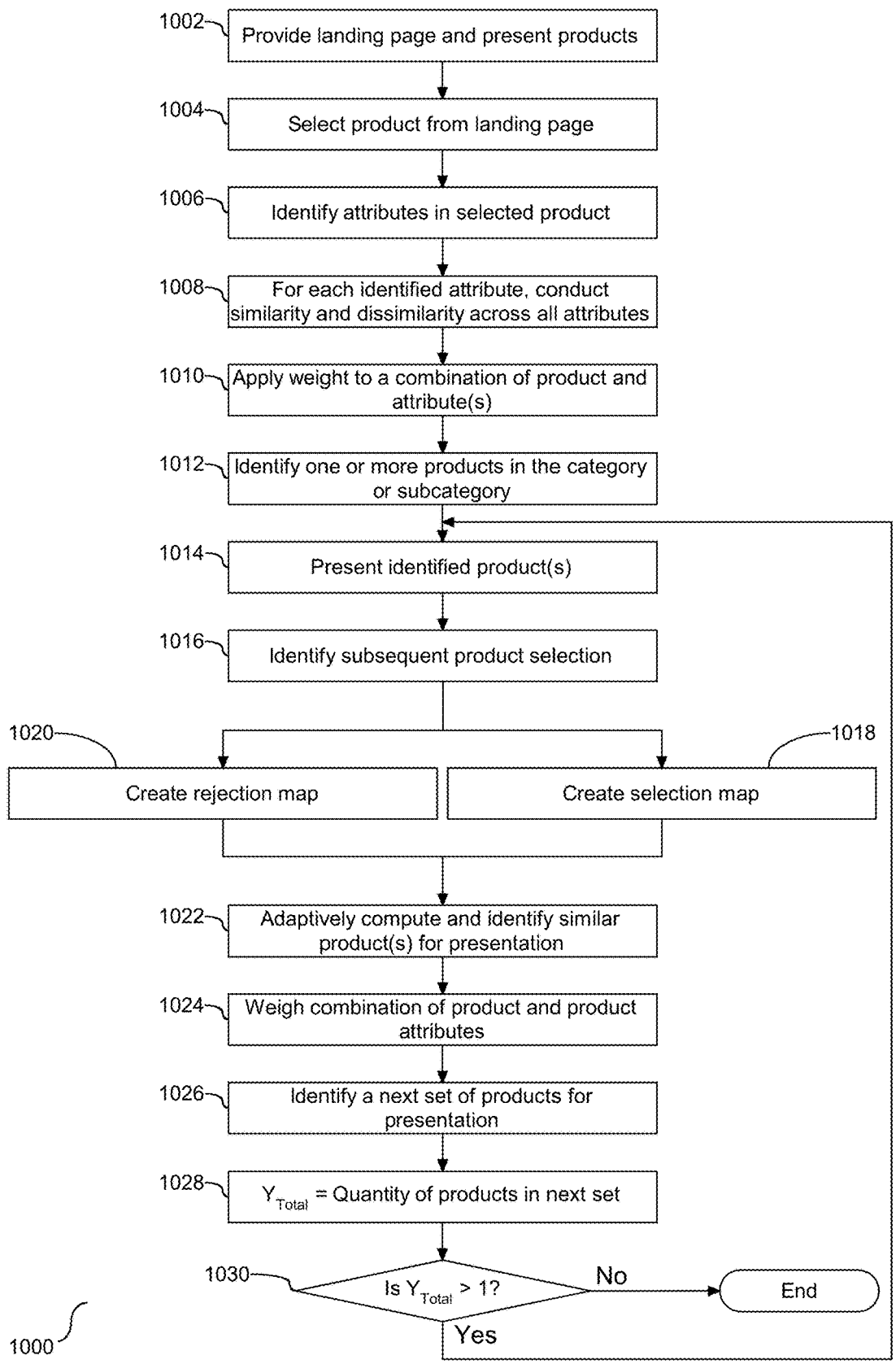
FIG. 10 depicts a flow chart illustrating product interaction and adaptive evaluation.

As shown in FIGS. 9A and 9B, similarity among products and product attributes is converted to a mathematical evaluation. Convergence on a product of interest employs adaptive similarity and non-similarity assessment. More specifically, the convergence employs the adaptive evaluations and integrates them into the product convergence. Referring to FIG. 10, a flow chart (1000) is provided illustrating product interaction and adaptive evaluation. As shown, a landing page is provided on an associated visual display and presents a plurality of products for a selected or defined category, or in one embodiment, a selected of defined sub-category (1002). In response to selection of a product from the landing page presentation (1004), the attributes in the selected product are identified (1006). For each identified attribute, both similar and dissimilar assessments are conducted across all of the attributes present in the category of the selected product (1008). See FIGS. 9A and 9B for the similarity and dissimilarity assessment(s) and associated computations. A weight is applied to a combination of product and attribute(s) (1010). In one embodiment, the application of the weight at step (1010) is in reverse order of similarity for non-selected product images, e.g. rejected product images. Based on the similarity computations, one or more products in the category or subcategory of the selected product are identified (1012) and presented (1014). In response to a subsequent product selection (1016), both a selection map and a rejection map are created (1018) and (1020), respectively. The selection and rejection maps function to provide insight of product navigation and selection(s).

The selection map is an assessment of the attributes present in one or more selected products and their associated images. As shown and described, the selection process may be limited to a single selection, or in one embodiment, may employ a plurality of selections. Each prior step in the product selection process is discounted by a factor, $\lambda$, where $0<=\lambda<=1$. The discount factor $\lambda$ is assigned to the integer 1 if there is no discounting, and it is assigned to 0 if only the present product is under consideration. For example, in a selection process of two iterations, for the first step discounting employs the discount factor of $\lambda^1$ for the first selection, and the discounting employs the factor of $\lambda^0$ for the second selection. The rejection map is similar to the selection map, but is applied to an assessment of the attributes present in one or more presented and non-selected products and their associated images. For each rejected product presented in the first or original landing page, the discounting factor is $\lambda^1$, and for each rejected product presented in the current landing page, the discounting factor is $\lambda^0$.

The similarity assessment shown and described in FIGS. 9A and 9B, together with the selection and rejection maps at steps (1018) and (1020), respectively, are utilized as input to adaptively compute and identify similar products for presentation (1022). More specifically, at step (1022), for each identified product attribute in the most recently selected product or product image sets, including the exponential discounting factor $\lambda$ for each prior product selection iteration, both similar and dissimilar attributes are identified across all attributes. A combination of product, and product attributes are weighed (1024). In one embodiment, the weighing or weight application is in reverse order of similarity from the rejected product sets. Following step (1024), a next set of products and product images are identified to be presented (1026). The variable $Y_{Total}$ is assigned to the quantity of products identified at step (1028). It is then determined if there is more than one product in the next set (1030). A negative response to the determination at step (1030) concludes the adaptive evaluation and product convergence assessment, and a positive response to the determination at step (1030) is followed by a return to step (1014). Accordingly, an adaptive assessment is conducted for both rejected and selected products to facilitation convergence on a final product in the identification and selection process.

Figure 11:
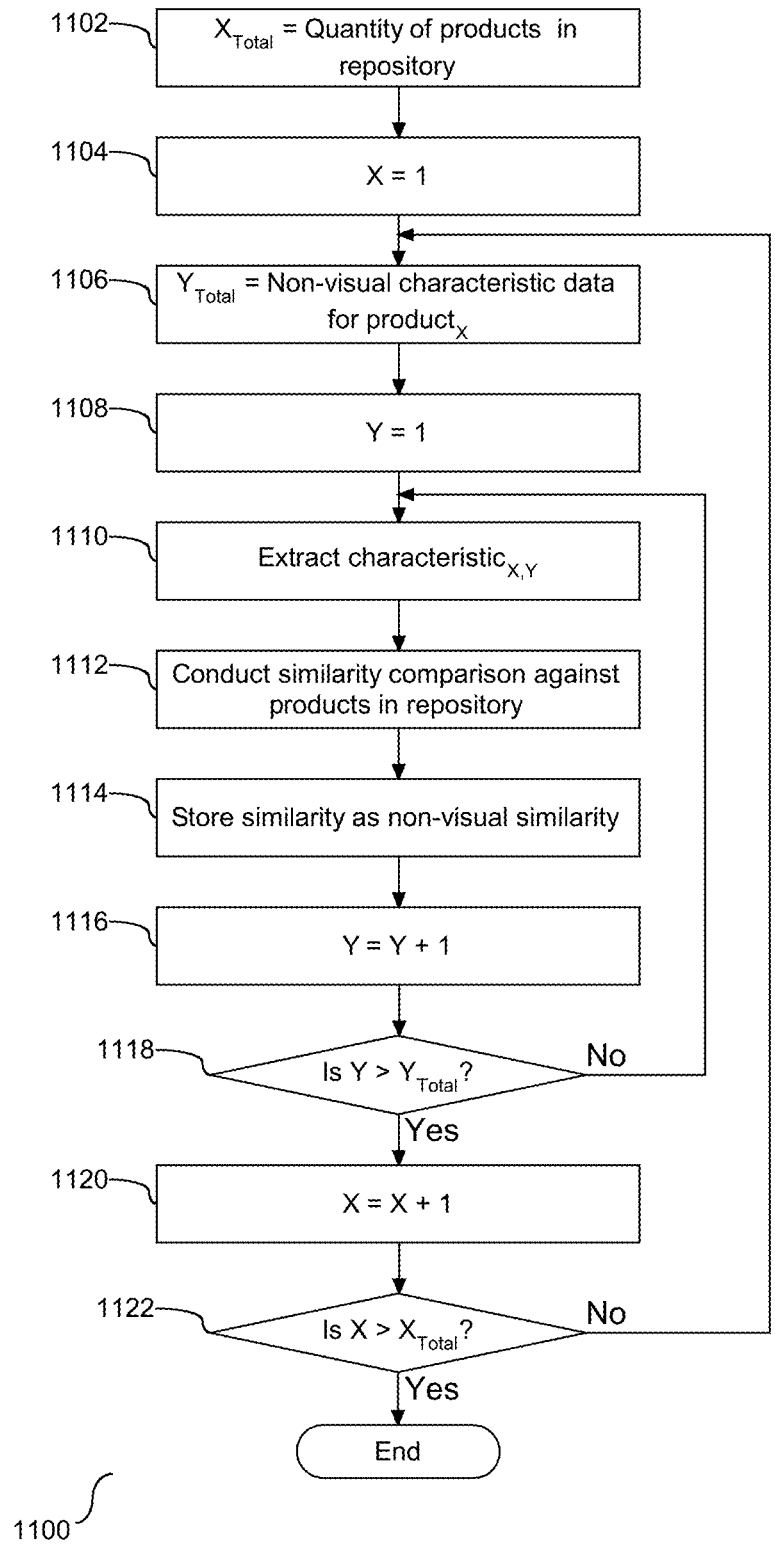
FIG. 11 depicts a flow chart illustrating a product repository of products and associated product descriptive data.

It is understood that each digital product image may contain non-visual characteristics, including but not limited to price, material, fit-type, style, etc. Referring to FIG. 11, a flow chart (1100) is provided illustrating a product repository of products and associated product descriptive data. The variable $X_{Total}$ is assigned to the quantity of products in the repository, or in one embodiment, the quantity of product in a class within a product classification (1102), and an associated product counting variable is initialized (1104). A quantity of non-visual product characteristics are identified for product$_X$ and assigned to the variable $Y_{Total}$ (1106), and an associated non-visual product characteristic counting variable is initialized (1108). For each product, non-visual characteristic$_{X,Y}$ is extracted (1110). It is understood that the non-visual characteristic may be NL processing data, including but not limited to textual data, or verbal data converted to textual data. As shown and described in FIG. 2, the information handling manager (270) processes the non-visual data, identifies terms within the data, converts the non-visual data to vector form for storage in the knowledge base (260). Following step (1110), and in conjunction with the natural language processing and the information handling manager (270), a similarity comparison is conducted against each product in the repository (1112). In one embodiment, the similarity comparison is limited to products within the same class or sub-class. Any found similarity is stored in a non-visual similarity database or repository according to attribute or characteristic$_{X,Y}$ (1114). Following step (1114), the characteristic counting variable is incremented (1116), and it is determined if all of the non-visual characteristics have been assessed for similarity (1118). A negative response to the determination at step (1118) is followed by a return to step (1110), and a positive response is followed by an increment of the product counting variable (1120). It is then determined if each product in the repository has been assessed (1122). A negative response at step (1122) is followed by a return to step (1106) for further similarity assessment(s), and a positive response concludes the non-visual characteristic similarity assessment. Accordingly, both visual and non-visual product characteristics are assessed for similarity measurements.

It is understood that product characteristics may not be pre-computed values. For example, it is understood that product data may come at least two different classes, including a class of data provided by a manufacturer or seller of the product, and another classes of data may be in the form of consumer feedback data that is provided as consumer input. For example, a prior purchaser may complete a survey directed at the product, including appearance, fit, etc. The consumer feedback may be presented in textual form, and as such, may be challenging to assess or quantify.

As shown in FIGS. 1-11, dynamic product assessment and convergence takes place in real-time based on physical input. The tools shown and described herein facilitate interaction and convergence. The similarity and adaptive attention assessments incorporate visual object characteristics together with natural language processing.

Aspects of dynamic experiential learning shown and described in FIGS. 1-11, employ one or more functional tools to support object representation, similarity assessment, and adaptive attention together with the artificial intelligence platform. Aspects of the functional tool(s), e.g. knowledge engine, and its associated functionality may be embodied in a computer system/server in a single location, or in one embodiment, may be configured in a cloud based system sharing computing resources. With references to FIG. 12, a block diagram (1200) is provided illustrating an example of a computer system/server (1202), hereinafter referred to as a host (1202) in communication with a cloud based support system, to implement the processes described above with respect to FIGS. 1-11. Host (1202) is operational with numerous other general purpose or special purpose computing system environments or configurations. Examples of well-known computing systems, environments, and/or configurations that may be suitable for use with host (1202) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (1202) may be described in the general context of computer system-executable instructions, such as program modules, being executed by a computer system. Generally, program modules may include routines, programs, objects, components, logic, data structures, and so on that perform particular tasks or implement particular abstract data types. Host (1202) may be practiced in distributed cloud computing environments where tasks are performed by remote processing devices that are linked through a communications network. In a distributed cloud computing environment, program modules may be located in both local and remote computer system storage media including memory storage devices.

Figure 12:
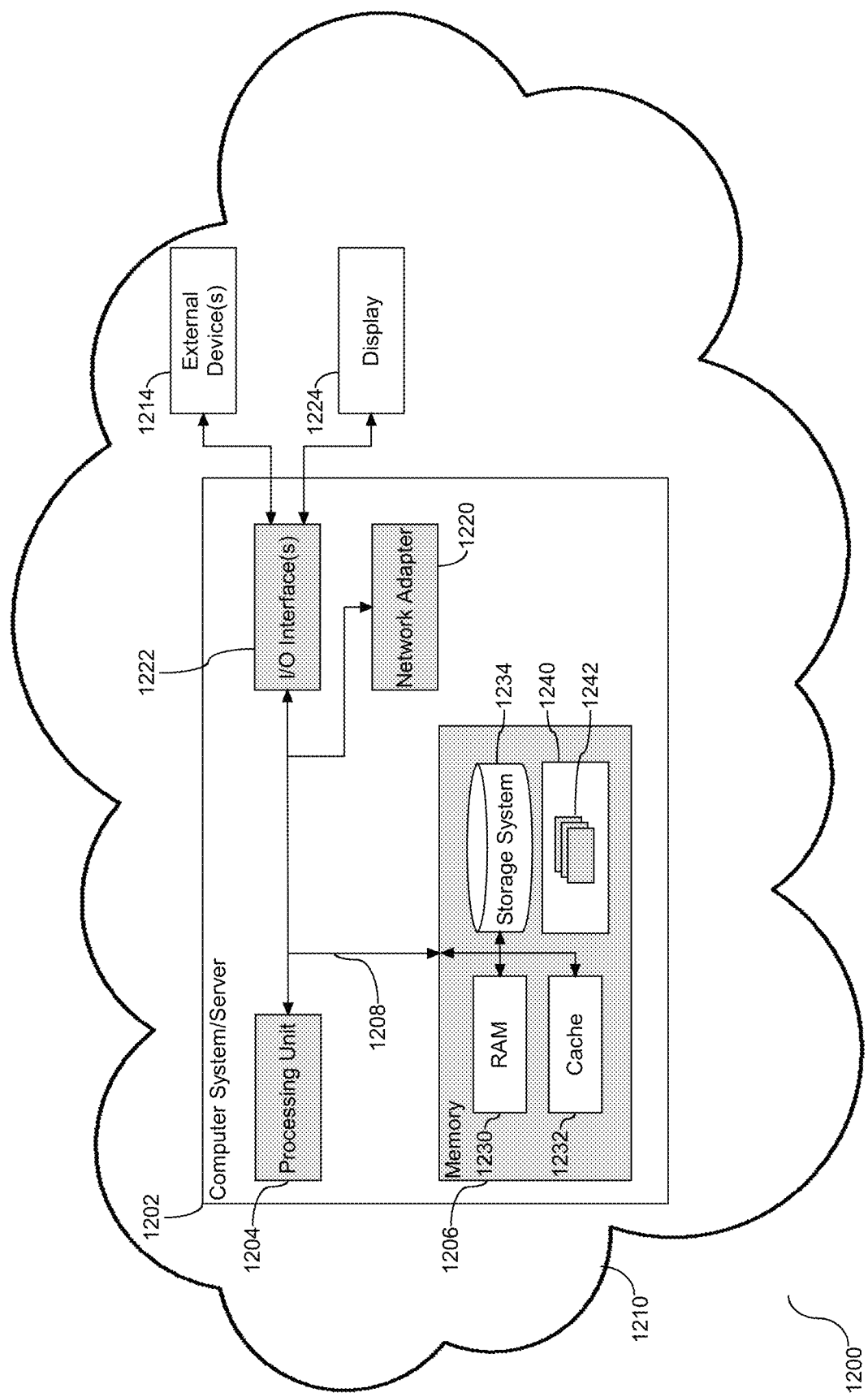
FIG. 12 is a block diagram illustrating an example of a computer system/server of a cloud based support system, to implement the process described above with respect to FIGS. 6-10.

As shown in FIG. 12, host (1202) is shown in the form of a general-purpose computing device. The components of host (1202) may include, but are not limited to, one or more processors or processing units (1204), a system memory (1206), and a bus (1208) that couples various system components including system memory (1106) to processor (1204). Bus (1208) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (1202) typically includes a variety of computer system readable media. Such media may be any available media that is accessible by host (1202) and it includes both volatile and non-volatile media, removable and non-removable media.

Memory (1206) can include computer system readable media in the form of volatile memory, such as random access memory (RAM) (1230) and/or cache memory (1232). By way of example only, storage system (1234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (1240), having a set (at least one) of program modules (1242), may be stored in memory (1206) by way of example, and not limitation, as well as an operating system, one or more application programs, other program modules, and program data. Each of the operating systems, one or more application programs, other program modules, and program data or some combination thereof, may include an implementation of a networking environment. Program modules (1242) generally carry out the functions and/or methodologies of embodiments to data modeling directed at object representation, similarity computation, adaptive attention, and natural language processing to experience a convergence. For example, the set of program modules (1242) may include the modules configured as the knowledge engine, information handling system, detection engine, and analyze as described in FIG. 2.

Host (1202) may also communicate with one or more external devices (1214), such as a keyboard, a pointing device, a sensory input device, a sensory output device, etc.; a display (1224); one or more devices that enable a user to interact with host (1202); and/or any devices (e.g., network card, modem, etc.) that enable host (1102) to communicate with one or more other computing devices. Such communication can occur via Input/Output (I/O) interface(s) (1122). Still yet, host (1202) can communicate with one or more networks such as a local area network (LAN), a general wide area network (WAN), and/or a public network (e.g., the Internet) via network adapter (1220). As depicted, network adapter (1220) communicates with the other components of host (1202) via bus (1208). In one embodiment, a plurality of nodes of a distributed file system (not shown) is in communication with the host (1202) via the I/O interface (1222) or via the network adapter (1220). It should be understood that although not shown, other hardware and/or software components could be used in conjunction with host (1202). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1206), including RAM (1230), cache (1232), and storage system (1234), such as a removable storage drive and a hard disk installed in a hard disk drive.

Computer programs (also called computer control logic) are stored in memory (1206). Computer programs may also be received via a communication interface, such as network adapter (1220). Such computer programs, when run, enable the computer system to perform the features of the present embodiments as discussed herein. In particular, the computer programs, when run, enable the processing unit (1204) to perform the features of the computer system. Accordingly, such computer programs represent controllers of the computer system.

In one embodiment, host (1202) is a node (1210) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
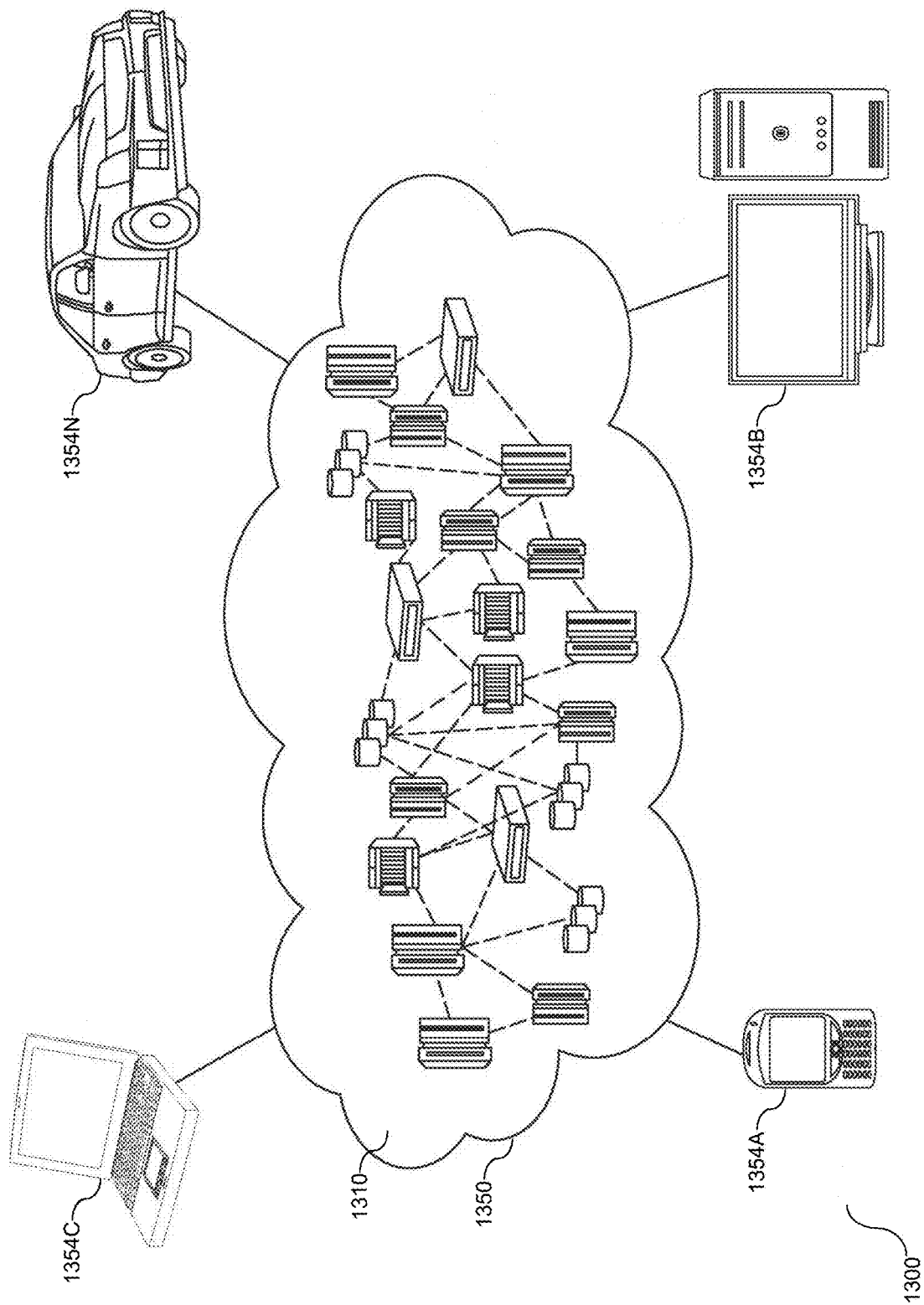
FIG. 13 depicts a block diagram illustrating a cloud computer environment.

Referring now to FIG. 13, an illustrative cloud computing network (1300). As shown, cloud computing network (1300) includes a cloud computing environment (1350) having one or more cloud computing nodes (1310) with which local computing devices used by cloud consumers may communicate. Examples of these local computing devices include, but are not limited to, personal digital assistant (PDA) or cellular telephone (1354A), desktop computer (1354B), laptop computer (1354C), and/or automobile computer system (1354N). Individual nodes within nodes (1310) may further communicate with one another. They may be grouped (not shown) physically or virtually, in one or more networks, such as Private, Community, Public, or Hybrid clouds as described hereinabove, or a combination thereof. This allows cloud computing environment (1300) to offer infrastructure, platforms and/or software as services for which a cloud consumer does not need to maintain resources on a local computing device. It is understood that the types of computing devices (1354A-N) shown in FIG. 13 are intended to be illustrative only and that the cloud computing environment (1350) can communicate with any type of computerized device over any type of network and/or network addressable connection (e.g., using a web browser).

Figure 14:
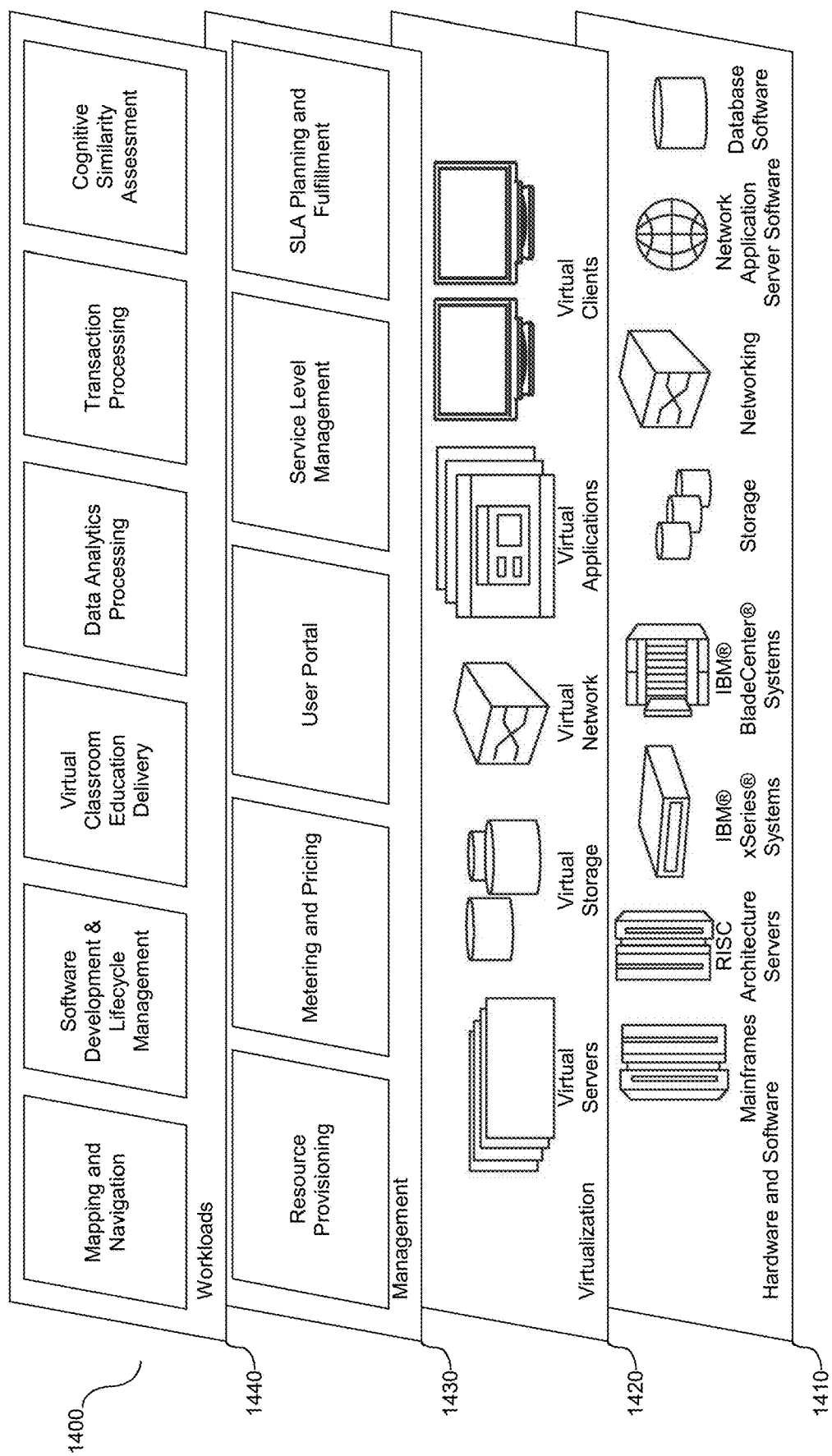
FIG. 14 depicts a block diagram illustrating a set of functional abstraction model layers provided by the cloud computing environment.

Referring now to FIG. 14, a set of functional abstraction layers (1400) provided by the cloud computing network of FIG. 12 is shown. It should be understood in advance that the components, layers, and functions shown in FIG. 14 are intended to be illustrative only, and the embodiments are not limited thereto. As depicted, the following layers and corresponding functions are provided: hardware and software layer (1410), virtualization layer (1420), management layer (1430), and workload layer (1440). The hardware and software layer (1410) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1420) provides an abstraction layer from which the following examples of virtual entities may be provided: virtual servers; virtual storage; virtual networks, including virtual private networks; virtual applications and operating systems; and virtual clients.

In one example, management layer (1430) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1440) provides examples of functionality for which the cloud computing environment may be utilized. Examples of workloads and functions which may be provided from this layer include, but are not limited to: mapping and navigation; software development and life-cycle management; virtual classroom education delivery; data analytics processing; transaction processing; and cognitive similarity assessment.

It will be appreciated that there is disclosed herein a system, method, apparatus, and computer program product for cognitive similarity assessment, identification convergence, and ascertaining and communicating an output object. As disclosed, the system, method, apparatus, and computer program product apply artificial intelligence processing to non-visual objects to contribute to identification convergence the output object.

While particular embodiments of the present embodiments have been shown and described, it will be obvious to those skilled in the art that, based upon the teachings herein, changes and modifications may be made without departing from these embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the artificial intelligence platform and associated processing may be carried out by different computing platforms or across multiple devices. Furthermore, the data storage and/or corpus may be localized, remote, or spread across multiple systems. Accordingly, the scope of protection of these embodiments is limited only by the following claims and their equivalents.

What is claimed is:

1. A system comprising:
    a processor operatively coupled to memory;
    a knowledge engine in communication with the processor to compute visual similarity across two or more objects represented as images, the knowledge engine comprising:
        an object manager and a context manager, the object manager to:
            employ an object detection algorithm to identify two or more image objects; and
            produce a tensor representation of each image object, wherein the tensor representation is a multi-feature mathematical representation of object image features, each object image feature being a physical component within the object;

the context manager to:
  assess multi-visual contextual similarity, including apply a vector similarity algorithm against one or more corresponding vectors of one or more related object images, and identify one or more similar objects based on a similarity context returned from the vector similarity algorithm; and
  responsive to selection of a product image, dynamically re-assess the similarity context based on proximity of the tensor representation of the selected product image to the tensor representation of the one or more related object images; and
  a final product identified and selected responsive to the dynamic re-assessment.

2. The system of claim 1, further comprising the context manager to:
  identify one or more attributes present in a selected product;
  conduct an adaptive similarity assessment across each accepted and rejected object image, the assessment to employ an exponential discount factor; and
  apply a weighted combination of the product and identified one or more attributes to converge on the final product.

3. The system of claim 2, further comprising the knowledge engine to rank the identified similar objects based on the returned similarity context.

4. The system of claim 3, further comprising the knowledge engine to adjust the rank of each non-selected similar object in the rank, the adjustment including a re-assessment of proximity of each object tensor representation to the similarity context.

5. The system of claim 4, further comprising the context manager to extract vectors corresponding to visual features represented by an image object attribute combination, and extract a similar vector for at least one similarly classified image object.

6. The system of claim 3, wherein the image object further comprises multiple components, and further comprising the object manager to produce the tensor representation of each image representation of the object components.

7. The system of claim 2, wherein the final product represents a convergence by the context manager on a directed outcome with minimal iterations of object interaction.

8. A computer program product to support an artificial intelligence platform, the computer program product comprising a computer readable storage device having program code embodied therewith, the program code executable by a processing unit to:
  compute visual similarity across two or more objects represented as images, including:
    employ an object detection algorithm to identify two or more image objects;
    produce a tensor representation of each image object, wherein the tensor representation is a multi-feature mathematical representation of object image features, each object image feature being a physical component within the object;
    assess multi-visual contextual similarity, including apply a vector similarity algorithm against one or more corresponding vectors of one or more related object images, and identify one or more similar objects based on a similarity context returned from the vector similarity algorithm; and
    responsive to selection of a product image, dynamically re-assess the similarity context based on proximity of the tensor representation of the selected product image to the tensor representation of the one or more related object images; and
  a final product identified and selected responsive to the dynamic re-assessment.

9. The computer program product of claim 8, further comprising the program code to:
  identify one or more attributes present in a selected product;
  conduct an adaptive similarity assessment across each accepted and rejected object image, the assessment to employ an exponential discount factor; and
  apply a weighted combination of the product and identified one or more attributes to converge on the final product.

10. The computer program product of claim 9, further comprising program code to rank the identified similar objects based on the returned similarity context.

11. The computer program product of claim 10, further comprising program code to adjust the rank of each non-selected similar object in the rank, the adjustment including a re-assessment of proximity of each object tensor representation to the similarity context.

12. The computer program product of claim 10, wherein the image object further comprises multiple components, and further comprising program code to produce the tensor representation of each image representation of the object components.

13. The computer program product of claim 12, further comprising program code to extract vectors corresponding to visual features represented by an image object attribute combination, and extract a similar vector for at least one similarly classified image object.

14. The computer program product of claim 9, wherein the final product represents a convergence by the program code on a directed outcome with minimal iterations of object interaction.

15. A method to computationally resolve object similarity, the method comprising:
  computing multiple context of visual similarity across two or more objects represented as images, comprising:
    employing an object detection algorithm to identify two or more image objects, each object being physical;
    producing a tensor representation of each image object, wherein the tensor representation is a multi-feature mathematical representation of object image features, each object image feature being a physical component within the object;
    assessing multi-visual contextual similarity, including applying a vector similarity algorithm against one or more corresponding vectors of one or more related object images, and identifying one or more similar objects based on a similarity context returned from the vector similarity algorithm; and
    responsive to selecting a product image, dynamically re-assessing the similarity context based on proximity of the tensor representation of the selected product image to the tensor representation of the one or more related object images; and
  a final product identified and selected responsive to the dynamic re-assessment.

16. The method of claim 15, further comprising ranking the identified similar objects based on the returned similarity context.

17. The method of claim 16, further comprising adjusting the ranking of each non-selected similar object in the ranking, the adjustment including re-assessing proximity of each object tensor representation to the similarity context.

18. The method of claim 16, wherein the image object further comprises multiple components, and further comprising producing the tensor representation of each image representation of the object components.

19. The method of claim 18, further comprising extracting vectors corresponding to visual features represented by an image object attribute combination, and extracting a similar vector for at least one similarly classified image object.

20. The method of claim 15, wherein the final product represents a convergence on a directed outcome with minimal iterations of object interaction.

* * * * *